(12) United States Patent
Okada et al.

(10) Patent No.: US 7,489,620 B2
(45) Date of Patent: Feb. 10, 2009

(54) OPTICAL INFORMATION RECORDING AND REPRODUCING MEDIUM

(75) Inventors: Mitsuya Okada, Tokyo (JP); Toshiaki Iwanaga, Tokyo (JP); Takeharu Shibatoko, Tokyo (JP); Hideki Tanabe, Tokyo (JP); Masashi Kubota, Tokyo (JP); Masaki Nakano, Tokyo (JP); Satoshi Sugaya, Tokyo (JP)

(73) Assignee: NEC Corporation, Tokyo (JP)

( * ) Notice: Subject to any disclaimer, the term of this patent is extended or adjusted under 35 U.S.C. 154(b) by 589 days.

(21) Appl. No.: 10/525,079

(22) PCT Filed: Aug. 21, 2003

(86) PCT No.: PCT/JP03/10567

§ 371 (c)(1),
(2), (4) Date: Feb. 18, 2005

(87) PCT Pub. No.: WO2004/019326

PCT Pub. Date: Mar. 4, 2004

(65) Prior Publication Data

US 2005/0270953 A1    Dec. 8, 2005

(30) Foreign Application Priority Data

Aug. 21, 2002    (JP) .............................. 2002-240122

(51) Int. Cl.
    *G11B 7/24* (2006.01)
(52) U.S. Cl. ..................................... 369/275.3; 369/94
(58) Field of Classification Search ........................ None
    See application file for complete search history.

(56) References Cited

U.S. PATENT DOCUMENTS

| 5,608,715 | A | * | 3/1997 | Yokogawa et al. | ........ 369/275.1 |
| 5,703,854 | A | * | 12/1997 | Kuroda et al. | ............ 369/47.44 |
| 5,764,620 | A | * | 6/1998 | Satoh et al. | ............... 369/275.1 |
| 6,751,171 | B2 | * | 6/2004 | Ohta | ........................ 369/44.13 |
| 6,850,469 | B2 | * | 2/2005 | Ogawa et al. | ............. 369/47.22 |
| 2003/0185121 | A1 | * | 10/2003 | Narumi et al. | ............ 369/47.53 |

FOREIGN PATENT DOCUMENTS

EP     1 124 221 A1    8/2001

(Continued)

OTHER PUBLICATIONS

H. Kitaura et al.; "Optical Data Storage 2001", SPIE Proceedings, vol. 4342; pp. 340-347.

(Continued)

*Primary Examiner*—Peter Vincent Agustin
(74) *Attorney, Agent, or Firm*—Whitham Curtis Christofferson & Cook, P.C.

(57) ABSTRACT

Optical information recording and reproducing medium 10 has two recording layers of first and second recording layers 12 and 14, from a laser beam incident surface side. In each control area 21, recording layer management information containing at least information indicating recording states of a plurality of areas into which the inside of data recording area 22 of each recording layer is divided is recorded. When recording or reproducing is performed on the second recording layer 14, the recording layer management information is checked, and a laser beam output is changed based on a recording state of an area corresponding to the first recording layer 12.

5 Claims, 7 Drawing Sheets

FOREIGN PATENT DOCUMENTS

| | | |
|---|---|---|
| EP | 1 176 586 A | 1/2002 |
| EP | 1 231 601 A | 8/2002 |
| EP | 1 260 972 A | 11/2002 |
| JP | 03-157816 | 7/1991 |
| JP | 05-101398 | 4/1993 |
| JP | 11-003550 | 1/1999 |
| JP | 2000 285469 A | 10/2000 |
| JP | 2000-293947 | 10/2000 |
| JP | 2000 293947 A | 10/2000 |
| JP | 2001-052337 | 2/2001 |
| JP | 2001-148133 | 5/2001 |
| JP | 2002-304730 | 10/2002 |
| WO | WO 02/029791 A1 | 11/2002 |

OTHER PUBLICATIONS

K. Nagata et al.; "Rewritable Dual-Layer Phase Change Optical Disk", Jpn. J. Appl. Phys., vol. 38 (1998), pp. 1679-1686.
Supplemental European Search Report issued by the European patent Office in relation to related European patent application on Nov. 14, 2007, pp. 1 to 6.
Office Action issued by the Japanese Patent Office on Mar. 10, 2008, with English language translation, pp. 1 to 3.

* cited by examiner

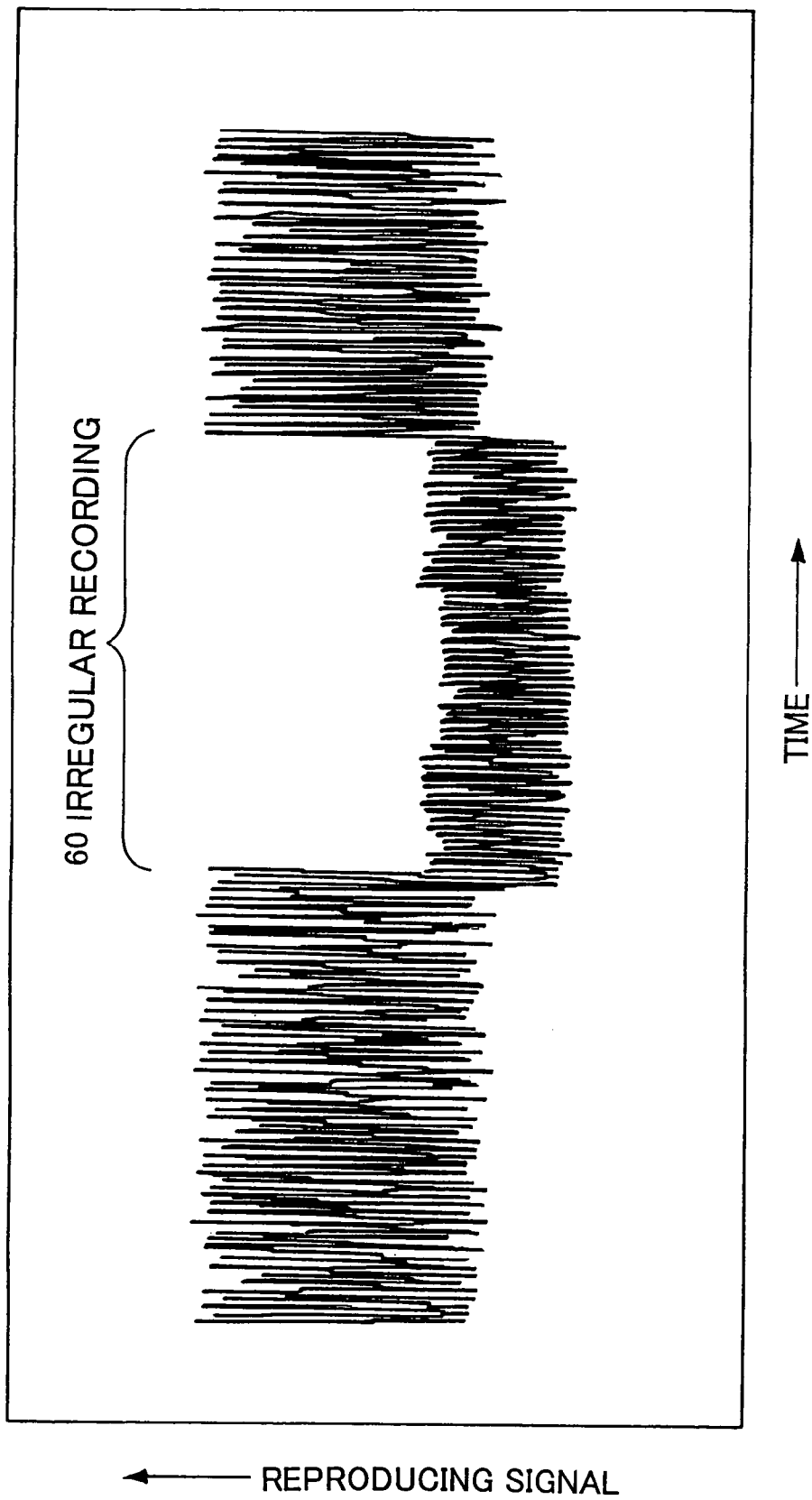

OPTICAL INFORMATION RECORDING AND REPRODUCING MEDIUM

TECHNICAL FIELD

The present invention relates to a recording method, a recording and reproducing method, a reproducing method, a recording device, a recording and reproducing device, and a reproducing device for an optical information recording and reproducing medium, which perform data recording and reproducing by irradiation with a laser beam, and the optical information recording and reproducing medium.

BACKGROUND ART

An optical disk recording device (optical disk) using a laser beam has a high recording density and can perform large-capacity recording. Because of an operation in non-contact, the device allows high-speed accessing and its practical application as a large-capacity memory has progressed. The optical disk is classified into a read only type which allows only reproduction, a write-once type which allows only one recording operation at a user side, and a rewritable type which allows repeated recording operations at the user side. The read only type is used for a compact disk or a laser disk, and various types are used for an external memory of a computer and document and image files.

In the read only type, a read signal is detected by using a change in the amount of a reflected light from a concavo-convex pit formed in the optical disk. In the write-once type, a read signal is detected by using a change in the amount of a reflected light from a very small pit formed in the optical disk, or a change in the amount of a reflected light caused by a phase change of a phase change recording film disposed in the optical disk.

In a magneto-optical disk which is one of the rewritable types, recording is performed by irradiating a magneto-optical recording film disposed in the optical disk with a high-output laser beam to change a magnetized state. A read signal is detected by using a magneto-optical effect of the magneto-optical recording film and based on a change in a polarization surface of a reflected light from the magneto-optical recording film. In a phase change optical disk which is another embodiment of a rewritable type, recording is performed by applying a high-output laser beam to cause a phase change in a phase change recording film disposed in the optical disk. As in the case of the phase change optical disk of the recordable type, a read signal is detected based on a change in the amount of a reflected light from the phase change recording film.

Generally, in the optical disk, a thin recording film is formed in a surface of a transparent resin material or glass substrate in which a spiral track groove (pre-groove) is formed at a pitch of 0.615 μm to 1.6 μm. When data is recorded or reproduced, a recording signal of the data is recorded on the recording film or a read signal is detected by tracking of a laser beam spot along the track groove. Generally, only one layer of the recording film is formed in the optical disk.

Incidentally, in the optical disk used for a file device or the like, there is always a demand for achievement of a large capacity, and attempts have been made to meet the demand. For example, in a DVD-RAM, a "land and groove recording system" for increasing a recording density by performing recording in both of concave and convex parts of the track groove has been employed, and put into practical use.

Additionally, there is a "multilayer" method as a method of achieving a larger capacity. This is a method of multiplexing a recording layer in a thickness direction of the optical disk. For example, in a DVD-ROM, an optical disk in which a recording layer is formed into two layers through a spacer layer of a thickness of about 25 to 40 μm has been put into practical use. According to an operation principle of the multilayered optical disk, when recording or reproducing is performed, a focus of a laser beam is offset in a thickness direction to access a desired recording film. In the DVD-ROM, by employing the two-layer formation, a recording capacity is increased from 4.7 GB in the case of one layer of a recording film to 8.5 GB, i.e., larger by about 1.8 times than that in the case of one layer of the recording film.

Studies have been conducted on application of the aforementioned multilayer method to the optical disks of the write-once and rewritable types. For example, in the write-once type, there are proposals of two-layer and even four-layer formations (for example, H. Kitaura et al.; SPIE Proceedings, Vol. 4342, pp 340 to 347, Optical Data Storage 2001.). In the rewritable type using the phase change recording layer, there is a proposal of two-layer formation (for example, K. Nagata et al.; Jpn. J. Appl. Phys., Vol. 38, (1998), pp 1679 to 1686). These proposals also anticipate a capacity increase of about 1.8 from that in the case of one layer of the recording film by the two-layer formation.

However, in the optical disk of the write-once type or the rewritable type using the phase change recording film, the following problem has occurred in the case of multilayer.

In the multilayered optical disk of the write-once type or the rewritable type, a recording layer of a side near a laser beam incident surface must have a fixed transmittance so that a laser beam of predetermined intensity can normally reach a recording layer of a farther side. However, in such an optical disk, because of using of a change in reflectance of the recording film for recording, the recording inevitably causes a change in transmittance of the recording film. Thus, when recording is performed on the recording film of the side near the laser beam incident surface, a change occurs in intensity of a laser beam which reaches the recording film of the farther side, causing a problem of adversely affecting recording and reproducing on and from these recording films. For example, irregular recording or recording loss occurs during recording, or reproduction failures occur during reproducing.

As one method of solving the problem, Japanese Patent No. 2928292 discloses a recording member, among optical information recording members, in which management information for identifying states of a plurality of recording-layers is formed on a recording layer nearest a light source, and a recording and reproducing device. According to this method, however, when recording or reproducing is performed on an information recording medium having a plurality of recording layers, especially when recording or reproducing is performed not on a recording layer of a side nearest a laser beam incident surface but a recording layer of a farther side, unless management information is formed in the layer, a complex process of checking the management information by layer jumping and moving to a desired recording layer by interlayer jumping again is necessary for each recording or reproducing. Thus, there is a drawback that the data recording or reproducing takes long time.

Therefore, objects of the present invention are to provide an optical information recording and reproducing medium, a recording device, a recording and reproducing device, a reproducing device, a recording method, a recording and reproducing method, and a reproducing method, which can perform stable recording or reproducing and a high-speed recording or reproducing operation on the optical information recording and reproducing medium whose recording film is multilayered.

DESCRIPTION OF THE INVENTION

That is, to achieve the object, according to the present invention, an optical information recording and reproducing medium having a plurality of recording layers which allow recording and reproducing by irradiation with a laser beam is characterized in that each recording layer comprises a recording area in which data recorded by a user of a disk, that is, user data, is recorded, and a recording management area in which recording layer management information containing at least information indicating recording states of a plurality of areas into which the inside of the recording area is divided is recorded, and recording layer management information of one recording layer is recorded in each of the recording management areas of the one recording layer and the other recording layer farther from a laser beam incident surface than the one recording layer.

The recording layer management information of one recording layer is recorded in each of the recording management areas of the one recording layer and the other recording layer farther from the laser beam incident surface than the one recording layer. Thus, when recording or reproducing is performed on the other recording layer, the recording layer management information of the one recording layer can be quickly checked without shifting a focus of a laser beam to the one recording layer by a layer jumping operation. Additionally, when data is recorded and reproduced on and from the other recording layer, a laser beam of relatively high intensity passes through the one recording layer. Thus, a possibility of losing the recording layer management information due to data rewriting may be relatively high in the one recording layer. Accordingly, by recording the recording layer management information of the one recording layer on the other recording layer in which the rewriting is difficult to occur, it is possible to disperse risks of losing the recording layer management information.

According to a preferred embodiment of the invention, defect management information indicating a defect position of the recording layer is further recorded in the recording management area of each recording layer. By further recording the defect management information of the recording layer management information of each recording layer, when recording and reproducing is performed on each recording layer, the defect management information is checked, and an influence of a defect on the recording or reproducing can be suppressed. Moreover, according to the invention, preferably, the defect management information of the one recording layer is recorded in a recording management area of the other recording layer. Thus, similarly, it is possible to quickly check the defect management information and to disperse risks of losing the defect management information.

According to a preferred embodiment of the invention, a guide groove of a wobbling shape is formed in at least one track of the recording layer, and the guide groove of the wobbling shape is subjected to track modulation for indicating a track address. By forming the guide groove of the wobbling shape for indicating the track address in the track of the recording layer, it is possible to suppress a non-uniform light scattering in a surface in which the guide groove is formed, and to perform stable recording or reproducing on the recording layer farther from the laser beam incident surface than the one recording layer.

According to an optical information recording and reproducing method, a recording method and a reproducing method of the present invention, the optical information recording and reproducing method for recording and reproducing data on and from an optical information recording and reproducing medium having a plurality of recording layers which allow recording and reproducing by irradiation with a laser beam is characterized in that when data recording or reproducing is performed on one recording layer, a recording state of the other recording layer nearer a laser beam incident surface than the one recording layer is examined by using recording layer management information, and setting of a laser beam output is changed for the recording or reproducing based on whether data has been recorded or not in an area stacked on an upper part of an area in which the recording is performed.

When reproducing or recording of data is performed on the one recording layer, the recording state of the other recording layer nearer the laser beam incident surface than the one recording layer is examined by using the recording layer management information, and the laser beam output is adjusted for the reproducing or reproducing based on whether data has been recorded or not in an area stacked on an upper part of an area in which the reproducing or reproducing is performed. Thus, by suppressing a change in intensity of the laser beam applied to the one recording layer, it is possible to perform stable data recording and reproducing on one recording layer. The change is caused by a difference of the recording state of the other recording layer.

According to the invention, under specific conditions, the laser beam output for the recording or reproducing is increased if data has been recorded in the area stacked on the upper part of the area in which the recording or reproducing is performed. Alternatively, under other conditions, the laser beam output for the recording or reproducing is reduced if data has been recorded in the corresponding area.

According to the preferred embodiment of the invention, an area for recording data of the one recording layer is moved to another area if data recorded and unrecorded parts are mixed together in the area stacked on the upper part of the area in which the recording is performed. When the mixed part is present in the area stacked on the area in which the recording is performed, if the recording is performed in this area, intensity of a laser beam applied to the recording layer is not constant, running a risk of generating irregular recording or recording loss. Thus, by moving the area for recording the data of the one recording layer to another area, it is possible to perform stable recording on the one recording layer.

If the data recorded and unrecorded parts are mixed together in the corresponding area of the other recording layer, data can be reproduced from the one recording layer after dummy data is recorded in the data unrecorded part. When the mixed recorded and unrecorded parts are present in the corresponding area, if reproducing is performed in this state, a fluctuation occurs in intensity of the laser beam applied to the one recording layer depending on the beam position, running a risk of generating reproducing failures. Thus, by recording the dummy data in the unrecorded part and making constant the intensity of the laser beam applied to the one recording layer, it is possible to perform stable data reproducing on the one recording layer.

When the mixed recorded and unrecorded parts exist in the corresponding area, if recording is performed in this state, intensity of the laser beam applied to the one recording layer is not constant, running a risk of generating recording failures. Thus, by recording the dummy data in the unrecorded part and making constant the intensity of the laser beam applied to the one recording layer, it is possible to perform stable data recording on the one recording layer.

According to an optical information recording device, a recording and reproducing device and a reproducing device of the present invention, the optical information recording and reproducing device for recording and reproducing data on and from an optical information recording and reproducing medium having a plurality of recording layers which allow recording and reproducing by irradiation with a laser beam is characterized by comprising at least reproducing means for reproducing from recording management area a recording state as to whether data has been recorded or not on a recording layer, condensing means for condensing a laser beam on a recording layer on or from which data is recorded or reproduced, and laser beam power switching means for examining, when data recording or reproducing is performed on one recording layer by the condensing means, a recording state of the other recording layer nearer a laser beam incident surface than the one recording layer by using recording layer management information reproduced by the reproducing means, and changing setting of a laser beam output for the recording or reproducing based on a recording state of an area stacked on an upper part of an area in which the recording or reproducing is performed. Thus, the device can be constituted as a device which provides the aforementioned effects.

According to the invention, preferably, the laser beam power switching means increases or reduces the laser beam output for the recording or reproducing in accordance with recording conditions if data has been recorded in the area stacked on the upper part of the area in which the recording or reproducing is performed. According to the preferred embodiment of the invention, if data recorded and unrecorded parts are mixed together in the area stacked on the upper part of the area in which the recording or reproducing is performed, the condensing means moves the area for recording to another area. Alternatively, the condensing means can reproduce data from the one recording layer after dummy data is recorded in the unrecorded part.

Additionally, the condensing means can record data on the one recording layer after the dummy data is recorded in the unrecorded part.

According to the optical information recording and reproducing medium of the invention, the recording layer management information of the one recording layer is recorded in each of the recording management areas of the one recording layer and the other recording layer farther from the laser beam incident surface than the one recording layer. Thus, it is possible to quickly check the recording layer management information of the one recording layer and to disperse risks of losing the recording layer management information.

According to the optical information recording and reproducing method, the recording method and the reproducing method of the invention, when the data recording or reproducing is performed on the one recording layer, the recording state as to whether data has been recorded or not on the other recording layer nearer the laser beam incident surface than the one recording layer is examined, and the laser beam output for the recording or reproducing is adjusted based on the recording state. Thus, it is possible to perform stable data recording and reproducing on the one recording layer. Moreover, according to the optical information recording device, the recording and reproducing device and the reproducing device, they can be constituted as devices which provide the aforementioned effects.

BRIEF DESCRIPTION OF THE DRAWINGS

FIG. 10 is a graph showing a reproducing signal measured on a conventional optical information recording and reproducing medium.

BEST MODE FOR CARRYING-OUT OF THE INVENTION

Figure 1:
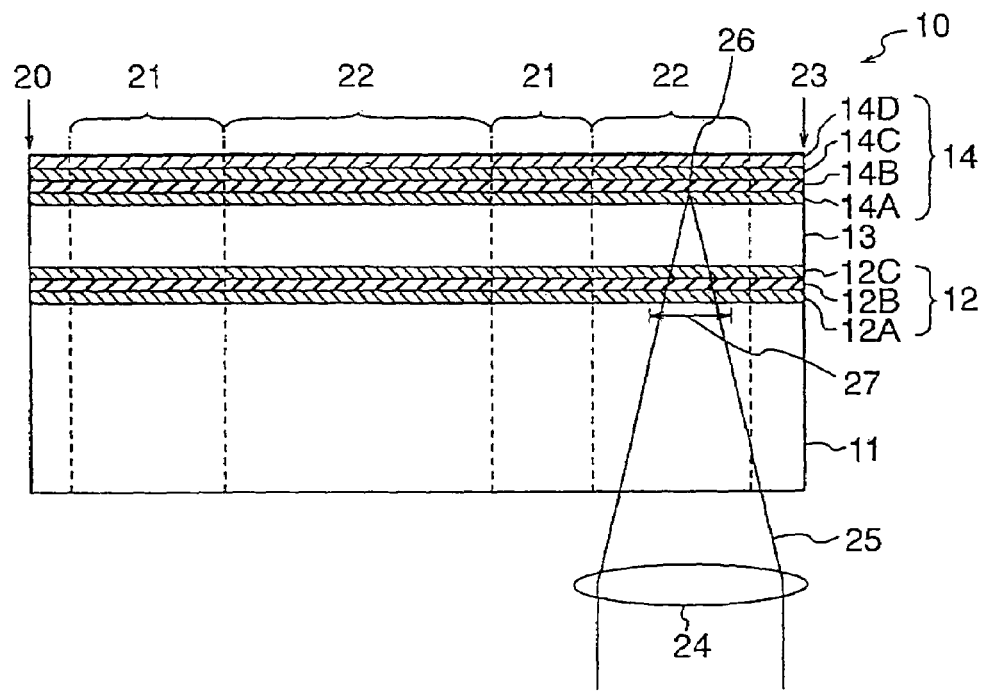
FIG. 1 is a sectional view showing a constitution of an optical information recording and reproducing medium according to a first embodiment of the present invention.

FIG. 1 is a sectional view showing a layer structure of an optical information recording and reproducing medium according to a first embodiment of the present invention. A medium 10 is an optical information recording and reproducing medium comprising a plurality of recording layers as information recording surfaces which allow recording and reproducing. Recording layer management information of each recording layer is recorded not only on the recording layer but also on all the recording layers farther from a laser beam incident surface than the recording layer. Recording layer management information of all the recording layers may be recorded in each of recording management areas of all the recording layers. In this case, data management of the recording management areas is facilitated.

As multilayer-structured disks having plural recording layers, there are a disk in which all are read only layers, all are write-once recording layers, or all are rewritable recording layers, and a disk in which a read only layer and a write-once recording layer are combined together, a read only layer and a rewritable recording layer are combined together, or a write-once recording layer and a rewritable recording layer are combined, as a combination of recording layers. The embodiment will be described by way of case in which rewritable recording layers based on phase changes are used for both recording layers.

That is, the medium 10 is an optical information recording and reproducing medium of a two-layered phase change type. The medium 10 comprises phase change type first and second recording layers 12 and 14 on a substrate 11, and is constituted by optically separating both recording layers from each other through a spacer layer 13. The substrate 11 is made of a glass, metal or polycarbonate resin, has a sufficient thickness of, for example, about 0.6 mm to be provided with rigidity equal to that of an optical disk such as a CD (Compact Disk) or a DVD (Digital Versatile Disk), and a concentric circle guide groove or spiral guide groove (not shown) is formed beforehand on its surface. The first recording layer 12 comprises a lower protective film 12A, a phase change recording film 12B and an upper protective layer 12C which are sequentially stacked together, and is formed on the substrate 11 by deposition method such as sputtering. The phase change recording film 12B is made of a material which causes a phase change by irradiation with a relatively high-output laser beam.

The spacer layer 13 is formed to be sufficiently thick with respect to a focal depth decided by a wavelength of a used laser or performance of a condenser lens 24, and has a thickness of maximum about 40 μm. The space layer 13 is formed by using a method of spreading a highly hardenable resin or a method of sticking a film-like resin having a uniform thickness. The concentric circle guide groove or spiral guide groove (not shown) is formed on the surface of the spacer layer 13. The guide groove of the spacer layer 13 is formed by using a method of transferring the hardenable resin by a stamper or the like after it is spread or a method of using a film in which a guide groove has been formed.

The second recording layer 14 comprises a lower protective film 14A, a phase change recording film 14B, an upper protective layer 14C, and a reflective film 14D which are sequentially stacked together, and is formed on the spacer layer 13 by deposition method such as sputtering. The phase change recording film 14B is made of a material which causes a phase change by irradiation with a relatively high-output laser beam as in the case of the phase change recording film 12B. The reflective film 14D is made of a material which exhibits a fixed reflectance with respect to an incident light.

For example, the following materials can be cited for the constituting layers. For each of the lower protective films 12A, 14A and the upper protective films 12C, 14C, a single film made of dielectric material such as ZnS, $SiO_2$, ZnS—$SiO_2$, GeN, GeCrN, AlN, TaO, GeAlN, SiO, $Al_2O_3$ or SiN, or a multilayer film made of these dielectric materials can be used. For each of the phase change recording films 12B, 14B, a thin film of GeSbTe, GeSbSnTe, AgInSbTe, GeTe, SbTe, InSbTe or the like can be used. For the reflective film 14D, Al, Ag, Au or NiCr, or an alloy mainly consisting of these components can be used.

Each recording layer of the medium 10 has a control area 21 and a data recording area 22 in a radial direction of a disk surface from a disk center 20 to a disk edge 23. In the data recording area 22, data recorded by a user of the disk, i.e., user disk, is recorded. In the control area 21, to perform good recording or reproducing on or from the medium 10, control data for controlling a recording device, a recording and reproducing device, and a reproducing device is stored. There is no particular limitation on the arrangement of the control area 21 and the data recording area 22. The control area 21 may be arranged on an inner peripheral side of the disk surface, and the data recording area 22 may be arranged on the outside thereof. Alternatively, as shown in FIG. 1, the control areas 21 may be arranged by being dispersed among a plurality of the data recording areas 22 spread from the inner periphery to the outer periphery. Here, the control area 21 also functions as a recording management area. Needless to say, a dedicated (exclusive) recording management area can be disposed separately from the control area 21.

In the control area 21, recording layer management information containing at least information indicating a recording state of each of a plurality of areas into which the data recording area 22 of the first recording layer 12 is divided is stored. The recording layer management information of the data recording area 22 of the first recording layer 12 is stored not only in the control area 21 of the first recording layer 12 but also in the control area 21 of the second recording layer 14.

In the first recording layer 12, transmittances are usually different between an area in which recording has been performed and an area in which no recording has been performed. Physically, a phase state change of the recording layer, a refractive index change, a shape change, a phase change, a structural change or the like occurs. In terms of a laser wavelength alone, however, it is a phenomenon that the change is optically seen as a change in transmittance. For example, in the case of the write-once type recording film in which a transmittance of a recorded part having a recording mark formed therein increases in comparison with that of an unrecorded part, the amounts of lights reaching the second recording layer 14 are different between a case in which the light passes through the unrecorded part of the first recording layer 12 to reach the second layer 14 and a case in which the light passes through the recorded part of the first recording layer 12 to reach the second layer. This means that when recording is performed, even if a laser beam of a similar output is emitted from a laser beam source side, a difference is generated in the amounts of lights reaching the second recording layer 14 depending on the recording state of the first recording layer 12. When reproducing is performed, depending on the recording state of the first recording layer 12, even if a laser beam of a similar output is emitted from the laser beam source side, a difference is generated in the amounts of lights that reach the second recording layer 14 and are reflected and received. In short, in the conventional medium, phenomena such as irregular recording, recording loss and reproducing failures easily occur, making it difficult to obtain reliability of recording and reproducing.

FIG. 10 shows a change in a read signal when reproducing is performed from the second recording film of the conventional two-layered optical disk. Irregular recording 60 occurs because when recording is performed on the second recording film, a laser beam passes across the recorded and unrecorded parts of the first recording film, a transmittance of the first recording layer is reduced in the part of the irregular recording 60, and intensity of the laser beam reaching the second recording layer is reduced.

On the other hand, according to the medium 10 of the embodiment, the recording layer management information of the first recording layer 12 is stored and when recording or reproducing is performed on the second recording layer 14, it is not necessary to move a focus of a laser beam to the first recording layer 12 by layer jumping, making it possible to quickly check the recording layer management information in the same recording layer. The recording state of the first recording layer 12 is checked based on the recording layer management information, and power reaching the second recording layer 14 can be adjusted to be equal by adjusting laser power based on the recording state of the first recording layer 12. Further, according to the medium 10, when recording or reproducing is performed on the second recording layer 14, a laser beam of relatively high intensity passes through the first recording layer 12. Accordingly, in this case, a possibility of losing the recording layer management information because of data rewriting may be relatively high in the first recording layer 12. Thus, for the recording layer management information of the first recording layer 12, the same data is recorded in the control area 21 of the second recording layer 14 in which the aforementioned rewriting is difficult to occur, making it possible to disperse risks of losing the recording layer management information.

According to the medium 10 of the embodiment, defect management information indicating a defect position of the data recording area 22 of each recording layer is stored in the control area 21. The defect management information of the first recording layer 12 is stored not only in the control area 21 of the first recording layer 12 but also in the control area 21 of the second recording layer 14.

Defects (defective parts) of the optical information recording and reproducing medium generally occurs because of certain non-uniformities, for example, presence of stuck things, a shape abnormality of the guide groove, exfoliation of the recording film, incursion of impurities into the substrate, and the like. These defects cause laser beam scattering, affecting a transmittance of the laser beam. That is, if there is a defect in the first recording layer 12, recording and reproducing on the second recording layer 14 will be affected. Accordingly, by managing the defect management information of the first recording layer 12, and by using a predetermined method described later, it is possible to suppress the influence of the defect in the first recording layer 12 on the recording and reproducing on the second recording layer 14. Moreover, by storing the defect management information of the first recording layer 12 in the control area 21 of the second recording layer 14, as in the case of the recording layer management information, it is possible to quickly check the information and to disperse risks of losing the defect management information.

Now, the recording layer management information will be described in detail. The recording layer management information must contain at least information indicating recording state of each of areas into which the inside of the data recording area is divided. However, a form of the management information is free. For example, as information indicating a recording state, a combination of recording layer number, start address of recorded part, and end address of recorded part or a combination of recording layer number, target area number, start address of recorded part, and end address of recorded part may be employed. If defect management information is contained, a combination of kind of information: recorded information or defect information, target area number, start address of recorded part, end address of recorded part, start address of recording inhibited part due to defect, and end address of recording inhibited part due to defect or a combination of flag indicating defect information, target area number, start address of recording inhibited part due to defect, and end address of recording inhibited part due to defect may be employed. Their information may be mixed to form management information.

When management is performed based on a radial position of an optical head used for recording and reproducing, a combination of recording layer number, start radius of recorded part, and end radius of recorded part or a combination of recording layer number, target area radius, start radius of recorded part, and end radius of recorded part may be employed. If defect management information is contained, a combination of kind of information: recorded information or defect information, target area radius, start radius of recorded part, end radius of recorded part, start radius of recording inhibited part due to defect, and end radius of recording inhibited part due to defect or a combination of flag indicating defect information, target area radius, start radius of recording inhibited part due to defect, and end radius of recording inhibited part due to defect. Additionally, their information may be combined to form management information, and can be used together with the aforementioned addresses.

When user data continuous for a long time such as video or audio data is managed, a position of a recording start time zero may be set as a reference on the medium, and information may be managed based on a recording time with it as a reference. In this case, a combination of recording layer number, recording start time of recorded part, and end time of recorded part or a combination of recording layer number, target area start time, start time of recorded part, and end time of recorded part may be employed. If defect management information is contained, a combination of kind of information: recorded information or defect information, recording start time of target area, start time of recorded part, end time of recorded part, start time of recording inhibited part due to defect, and end time of recording inhibited part due to defect or a combination of flag indicating defect information, recording start time of target area, start time of recording inhibited part due to defect, and end time of recording inhibited part due to defect may be employed. Additionally, their information may be combined to form management information, and can be used together with the aforementioned addresses and the radial positions.

As information indicating a recording state, a form of a bit map may be employed. For example, to enable identification of an ECC block usage for each recording layer, a bit map can be created in which "1" shows a recorded block and "0" for unrecorded one. In this case, a head bit corresponds to a head ECC block of the recording layer. This bit map may be formed by a sector unit, or separated by an area.

Further, information indicating a defect may be in a form of a bit map. For example, a bit map is created in which presence of a defect is "1" and no defect is "0" in the ECC block unit for each recording layer. In this case, a head bit corresponds to a head ECC block of the recording layer. Needless to say, this bit map may be formed by a sector unit, or separated by an area.

The case in which the recording management information indicates presence or no presence of recording, or presence or no presence of a defect has been described. In addition to this information, information indicating a kind of contents, information indicating the number of repeated recording times of the recorded part, and the like may be included.

Figure 6:
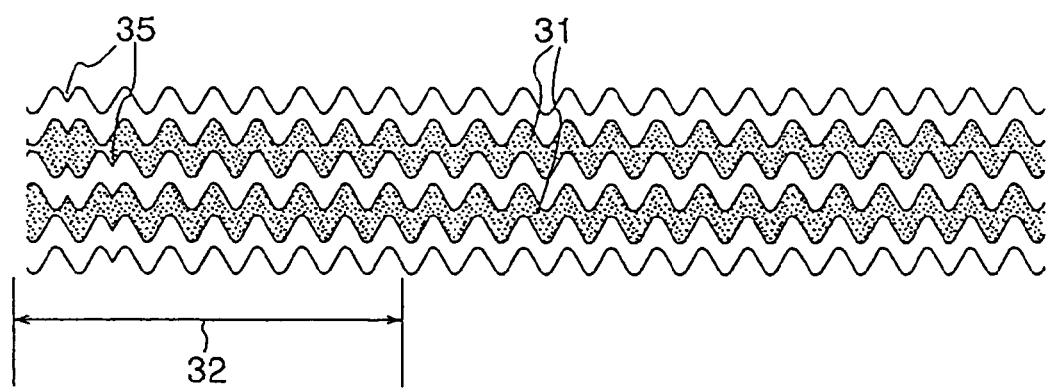
FIG. 6 is a plan view showing a guide groove of a wobbling shape.

According to the medium 10, for the guide groove in which the first recording layer 12 is formed, a guide groove (wobbling groove) 31 formatted into a wobbling shape meandering in a direction orthogonal to a tracking direction similar to that shown in FIG. 6 is employed. In the optical disk or the like, generally, an address imparting part 32 is disposed in a part of the guide groove in a tangential direction to impart address information of each track constituting the guide groove.

Figure 5:
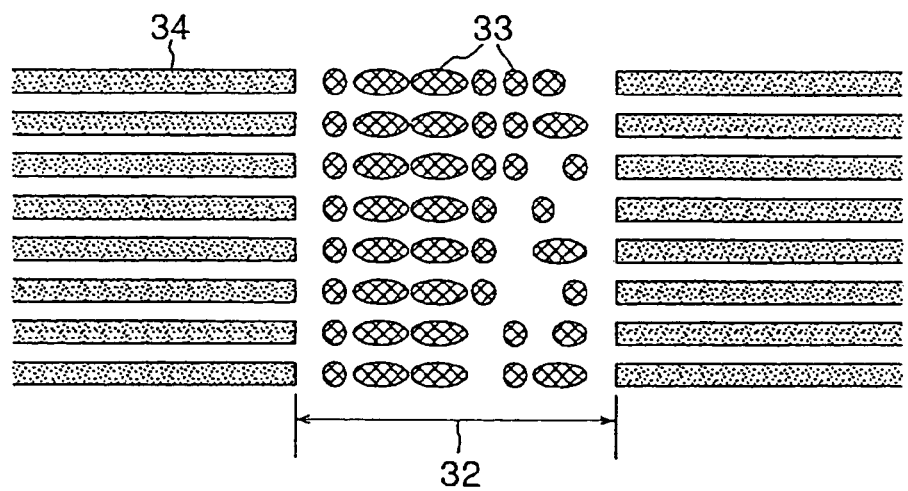
FIG. 5 is a plan view showing a guide groove in which a pre-pit is formed.

As an address imparting method frequently used conventionally, there is a method of forming a pre-bit 33 similar to that shown in FIG. 5. According to this method, a normal shape guide groove 34 having no meandering is employed. In the address imparting part 32, an irregular island-shaped pre-bit 33 is formed for each track in place of the guide groove 34. By this method, however, groove shapes are greatly different between the address imparting part 32 and other areas, making surface scattering of both areas greatly different. Thus, intensity of a transmitted light near the address imparting part 32 is disturbed, causing a difficulty of stable recording and reproducing on the second recording layer 14.

Thus, it is advisable to employ the wobbling groove 31 of the shape having repeated constant meandering shown in FIG. 6 for the guide groove of the medium 10 of the embodiment. In the address imparting part 32, the wobbling groove 31 is directly formed, and its shape is partially irregular. In the embodiment shown in FIG. 6, a phase of repeated meandering is shifted by 180° at a position 35. As a method of making the groove shape irregular, in addition to the above, for example, there is a method of shifting a cycle of repeated meandering within ±10% in the address imparting part 32. In any case, in the case of forming the wobbling groove 31, a difference in groove shape between the address imparting part 32 and the other groove forming part is small in comparison with that in the case of forming the pre-bit 33, and a difference in surface scattering between both areas is small. Thus, it is possible to suppress disturbance of the intensity of the transmitted light even near the address imparting part 32 and to perform stable recording and reproducing on the second recording layer 14.

According to the medium 10 of the embodiment, by storing the recording layer management information and defect management information of the first recording layer 12, it is always possible to perform stable recording and reproducing by checking the information when the recording or reproducing is performed on the second recording layer 14. By storing the recording layer management information and defect management information of the first recording layer 12 in the control area 21 of the second recording layer 14, it is possible to quickly check the information and to disperse risks of losing the information. Moreover, by forming the wobbling groove 31 in the first recording layer 12, it is possible to suppress the disturbance of the intensity of the transmitted light near the address imparting part 32, thereby enabling stable data recording and reproducing.

A recording and reproducing method, a recording method and a reproducing method for the medium 10 of the embodiment will be described. First, when recording or reproducing is performed on the second recording layer 14, the control area 21 of the second recording layer 14 is checked. In this case, for a target area 26 of the second recording layer 14 in which the recording or reproducing is performed, checking is made as to whether a recording state of an area 27 of the first recording layer 12 stacked on an upper part of the second recording layer is recorded or unrecorded. The area 27 is set on the basis of the spread of a laser beam 25 on the first recording layer 12 when the laser beam 25 is focused on the second recording layer 14, and by considering a track width of the second recording layer 12 and a disk decentration (decentering) shifting amount between the first and second recording layers 12 and 14. Next, based on the checked recording state of the area 27 of the first recording layer 12, a laser beam output is properly changed to a predetermined output, and the recording or reproducing is performed on the second recording layer 14. For example, when recording on the first recording layer causes a change of an average transmittance of the recording area from 50% to 61%, the amount of a laser beam 25 transmitted to the second recording layer is accordingly changed. In this case, if a laser beam output to the first recording layer recorded part is set to be 0.82 times that of the unrecorded part, equal power reaches the second recording layer. In the case of reproducing, no fluctuation in a detection amount of a photo-detector for generating a reproducing signal than in the amount of light reaching the second recording layer is preferable. Accordingly, in the case of exemplified conditions, if a reproducing laser beam output to the first recording layer recorded part is set to be 0.67 times that of the unrecorded part, equal power reaches the photo-detector. Thus, when the recording or reproducing is performed on the second recording layer 14, optimal transmitted light intensity is obtained, making it possible to perform stable recording and reproducing.

It is to be noted that with regard to power conditions during the recording or reproducing, for the cases of recording and non-recording on the first recording layer, prescribed values may be prerecorded in a desired area of the medium, read and set. Alternatively, the recording and reproducing device may identify the medium, read prescribed values specified for the medium and set the values.

If the checked recording state of the area 27 of the first recording layer 12 indicates a mixture of recorded and unrecorded parts, the following is carried out. When recording is performed, it is difficult to perform stable recording on the second recording layer 14. Accordingly, basically, it is preferable to avoid recording on the second recording layer 14 of this area, and recording is carried out by moving to an unrecorded alternative (substitute) area. Thus, it is possible to prevent irregular recording or recording loss.

On the other hand, when reproducing is performed, first, pseudo recording is carried out on the unrecorded part of the area of the mixed state, thereby eliminating the mixed state. Next, a laser beam output is changed to a predetermined output of the recording time, and reproducing is performed. Accordingly, stable reproducing is carried out by irradiating the second recording layer 14 with a transmitted light of uniform intensity, making it possible to suppress reproducing failures. It is advisable to use prescribed pseudo data for the pseudo recording.

When recording or reproducing is performed on the second recording layer 14, it is advisable to check the defect management information of the first recording layer 12. The defect management information is checked and when there is a defect in the area 27 of the first recording layer 12 stacked on the upper part of the area of the second recording layer 14 in which the recording is performed, for example, means for carrying out recording by moving to an alternative area can be employed. Thus, it is possible to suppress irregular recording or recording loss.

According to the recording and reproducing method, the recording method and the reproducing method of the medium 10 of the embodiment, when recording or reproducing is performed on the second recording layer 14, a recording state of the area 27 of the first recording layer 12 is checked based on recording layer management information, and a laser beam output is changed so that intensity of a transmitted light can be optimal. If the area 27 is in a mixed state, recording is carried out by moving to an alternative (substitute) area, or reproducing is carried out after pseudo recording is performed. Further, a defect position of the first recording layer 12 is checked based on defect management information, and predetermined means is implemented. By these methods, it is possible to suppress conventional problems such as irregular recording, recording loss and recording failures.

Figure 2:
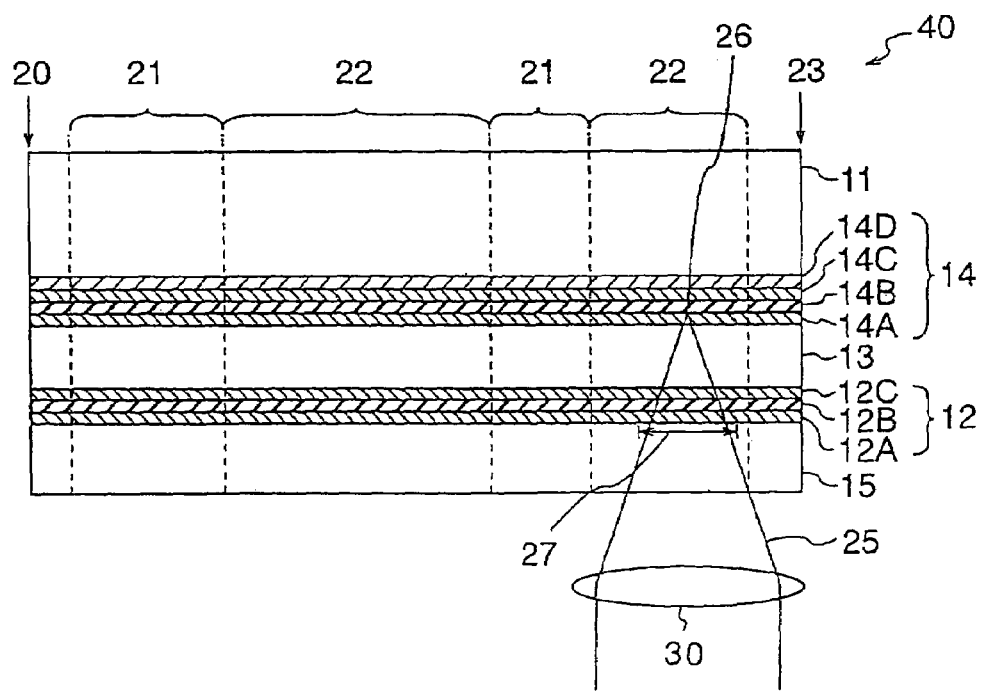
FIG. 2 is a sectional view showing a constitution of an optical information recording and reproducing medium according to a second embodiment of the present invention.

FIG. 2 is a sectional view showing a layer structure of an optical information recording and reproducing medium according to a second embodiment of the present invention. The case of using the substrate 11 having rigidity and the guide groove formed therein has been described. As the layer structure of the optical information recording and reproducing medium, however, a medium 40 shown in the drawing may be employed. The medium 40 is an optical information recording and reproducing medium which employs a condenser lens 30 or the like having a high numerical aperture (NA) to shorten a focal length, thereby achieving a high density. Accordingly, the medium has a constitution in which a thick cover layer 15 is formed on a laser beam incident surface and a substrate 11 having a large thickness is formed on a side opposed to the laser beam incident surface.

That is, the medium 40 is similar in constitution to the medium 10 of the first embodiment except for the fact that the thick cover layer 15 having a film thickness of about 0.1 mm is disposed on the laser beam incident surface side in place of the substrate 11, and the substrate 11 is disposed on the backside of the second recording layer 14. With this constitution, the medium 40 can achieve a high density equal to or higher than that of, for example, a DVD.

Figure 3:
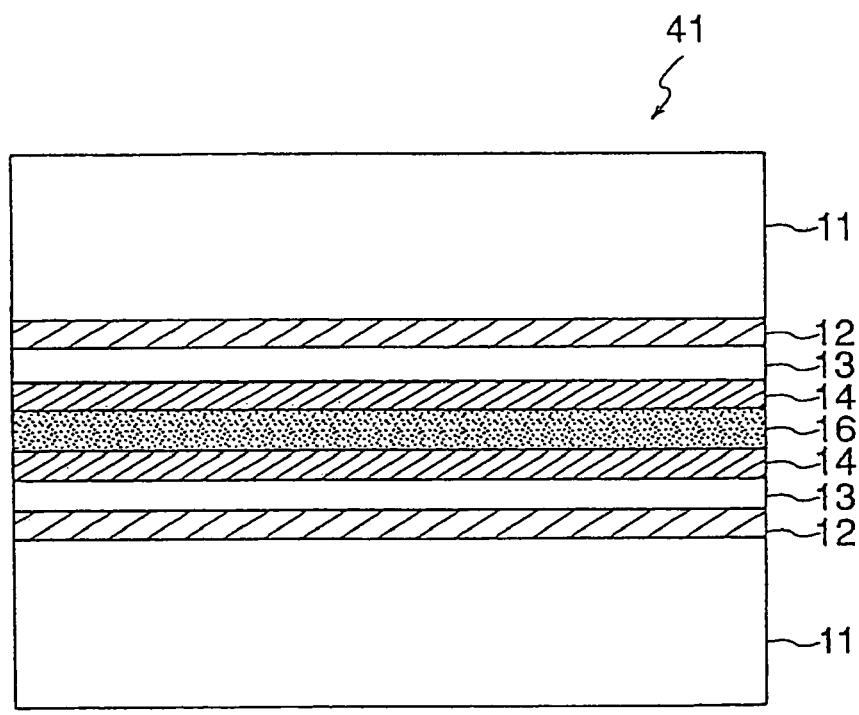
FIG. 3 is a sectional view showing a constitution of an optical information recording and reproducing medium according to a third embodiment of the present invention.

FIG. 3 is a sectional view showing a layer structure of an optical information recording and reproducing medium according to a third embodiment of the present invention. For the layer structure of the optical information recording and reproducing medium, a structure similar to that of a medium 41 shown in the drawing may be employed. In the medium 41, the constitution of the medium 10 shown in FIG. 1 is change to double-surface constitution. The medium 41 has a constitution in which the second recording layers 14 of the two media 10 are set to face each other and stuck together through an adhesive layer 16. With this constitution, it is possible to achieve a much larger capacity. It is to be noted that one of the stuck media 10 may be a dummy substrate when necessary.

Figure 4:
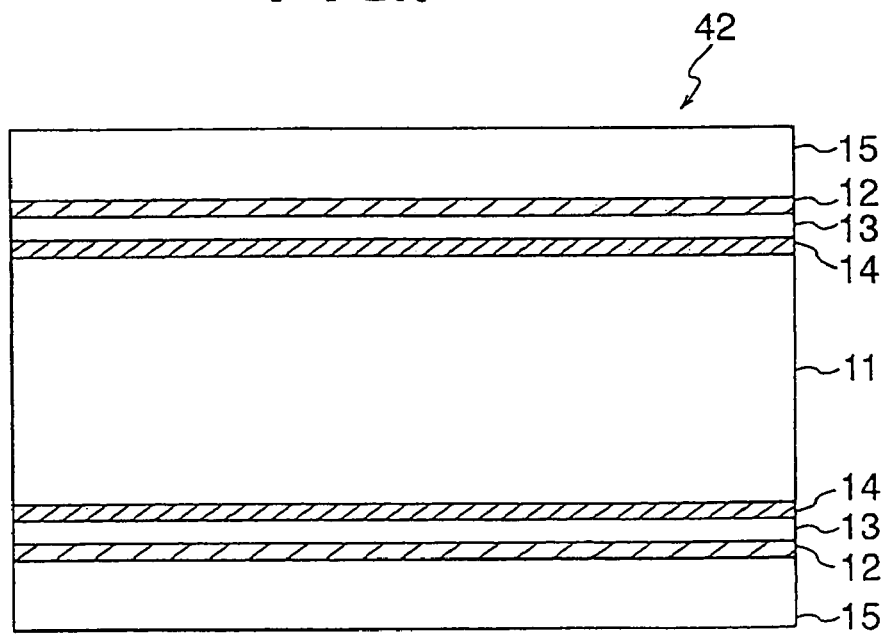
FIG. 4 is a sectional view showing a constitution of an optical information recording and reproducing medium according to a fourth embodiment of the present invention.

FIG. 4 is a sectional view showing a layer structure of an optical information recording and reproducing medium according to a fourth embodiment of the present invention. For the layer structure of the optical information recording and reproducing medium, a structure similar to that of a medium 42 shown in the drawing may be employed. In the medium 42, the constitution of the medium 40 shown in FIG. 2 is change to double-surface constitution. The medium 42 has a constitution in which the substrate 11 is made common and the two media 40 are formed on both surfaces of the substrate 11. With this constitution, it is possible to achieve a much larger capacity.

The optical information recording and reproducing medium using the phase change recording layer for the recording layer has been described. However, the media of the first to fourth embodiments can be applied to, for example, a so-called recordable medium (R medium) of a write-once type. In this case, for a recording layer, a thin film containing an organic dye with fixed absorption to a used laser wavelength, a low melting point metal such as Sn, Bi, In, Te or Pb, or an easily deformable material such as Si or Ge is employed. A constitution may also be employed in which a dielectric protective film or a reflective film is formed on and below the organic pigment or the thin film.

Figure 7:
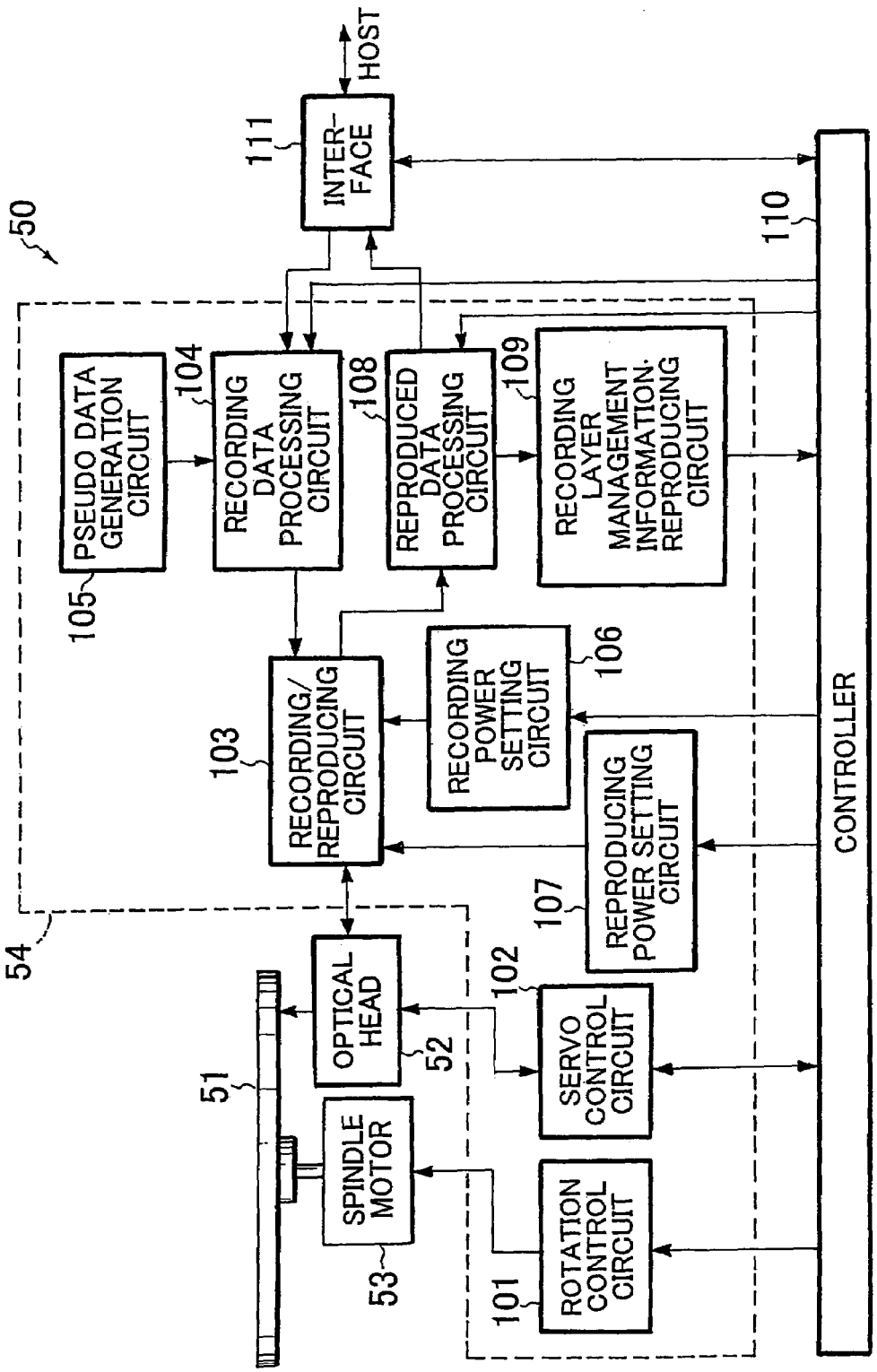
FIG. 7 is a block diagram showing a constitution of an optical information recording and reproducing device according to an embodiment of the present invention.

FIG. 7 is a block diagram showing a constitution of an optical information recording and reproducing device according to an embodiment of the present invention. A basic constitution is that the device comprises an optical information recording and reproducing medium having a plurality of recording layers which allow recording and reproducing by irradiation with a laser beam, an optical head for condensing a laser beam on a recording layer on which data recording or reproducing is performed, a recording and reproducing circuit, recording layer management information-reproducing means used for reproducing recording layer management information containing at least information indicating a recording state of the recording layers, recording power setting means and reproducing power setting means which function as laser beam power switching means for changing setting of recording laser beam output, and a pseudo data generation circuit. A device 50 performs recording and reproducing on the optical information recording and reproducing medium while transferring data with an outside host.

The device 50 comprises an optical disk 51 which is an optical information recording and reproducing medium, an optical head 52 for performing an optical operation on the optical disk 51, a spindle motor 53 for supporting and rotating the optical disk 51, a circuit group 54 for controlling the optical head 52 and the spindle motor 53, a controller 110 for performing the entire control for the circuit group 54, and an interface 111 for transferring data with the outside host.

The circuit group 54 comprises a rotation control circuit 101, a servo control circuit 102, a recording and reproducing circuit 103, a recording data processing circuit 104, a pseudo data generation circuit 105, a recording power setting circuit 106, a reproducing power setting circuit 107, a reproduced data processing circuit 108, and a recording layer management information-reproducing circuit 109.

The optical disk 51 is the optical information recording and reproducing medium having two recording layers as in the case of each of the first to fourth embodiments. The optical head 52 comprises a laser beam source for irradiating the optical disk 51 with a laser beam, and a photo-detector for detecting a reflected light from the optical disk 51 during reproducing. The optical head 52 causes the laser beam source to emit a laser beam by using a driving signal from the recording and reproducing circuit 103, and condenses the laser beam in a predetermined position on the rotating optical disk 51. During reproducing, the reflected light from the optical disk 51 is detected by the photo-detector. The laser beam source emits a laser beam of an output higher during recording than that during reproducing. The spindle motor 53 is controlled by the rotation control circuit 101 to rotate the optical disk 51 to a predetermined rotating position.

The rotation control circuit 101 controls rotation of the spindle motor 53. The servo control circuit 102 performs focus control, tracking control and position control of the optical head 52 based on a servo error signal from the recording and reproducing circuit 103 and a command from the controller 110.

During reproducing, the recording and reproducing circuit 103 amplifies a signal detected by the photo-detector of the optical head 52 and generates a reproduced data signal, a signal about recording layer management information stored in the control area 21, a focus servo error signal, a tracking servo error signal and the like. During recording, a signal received from the recording data processing circuit 104 is supplied to the optical head 52.

The recording data processing circuit 104 adds an error correction code to recording data received from the interface 111, and transmits the data to the recording and reproducing circuit 103. In the case of performing pseudo recording, pseudo data received from the pseudo data generation circuit 105 is processed to be data for recording, and transmitted to the recording and reproducing circuit 103.

During the pseudo recording, the pseudo data generation circuit 105 generates pseudo data, and transmits the data to the recording data processing circuit 104. The recording power setting circuit 106 changes a laser beam output to a predetermined value on the basis of a command from the controller 110 when necessary for the recording. The reproducing power setting circuit 107 changes the laser beam output to a predetermined value on the basis of a command from the controller 110 when necessary for the reproducing.

The reproduced data processing circuit 108 demodulates a reproduced data signal received from the recording and reproducing circuit 103 to be reproduced data, subjects the data to error correction, and then transmits the data to the interface 111. The recording layer management information-reproducing circuit 109 receives a signal from the reproduced data processing circuit 108 during reproducing in the control area 21, generates data about a recording state of the control area 21, and transmits the data to the controller 110.

The controller 110 controls their circuits, the interface and the like. The interface 111 receives recording and reproducing command data and recording data from the outside host, and transmits reproduced data thereto.

With this constitution, the device 50 can be constituted as the optical information recording and reproducing device having effects similar to those of the optical information recording and reproducing media of the first to fourth embodiments.

Next, description will be made for a recording and reproducing method, a recording method, and a reproducing method according to an embodiment of the present invention which use the aforementioned optical information recording and reproducing medium and the device. The description will be made on the assumption that recording and reproducing is performed on a phase change type recording film. The optical disk 51 that is an optical information recording and reproducing medium has a constitution of two recording layers, and recording or reproducing is performed by using the optical head 52. As shown in FIG. 1, the control areas 21 are disposed in the first and second recording layers 12 and 14 of the optical disk 51, and recording layer management information regarding a recording state of the first recording layer 12 is stored therein. In other words, as described above, the control area 21 functions as a recording management area.

There is no limitation on arrangement of the recording layer management information in the control area for storing the recording layer management information. For example, seen from the laser beam incident side, the recording layer management information of the second recording layer may be arranged by being superposed on a deep side of the recording layer management information arranged position of the first recording layer. Alternatively, the recording layer management information of the second recording layer may be arranged in a position not superposed on the deep side of the recording layer management information arranged position of the first recording layer.

In the case of arranging the recording layer management information of the second recording layer in the position not superposed on the deep side of the recording layer management information arranged position of the first recording layer, the recording or reproducing on the second recording layer is not affected by the recorded state of the first recording layer, and thus reliability of recording or reproducing of the recording layer management information is higher.

At least the recording layer management information of the first recording layer only needs to be recorded on the first recording layer. However, at least the recording layer management information of the first recording layer must be recorded on the second recording layer, and recording of the recording layer management information of the second recording layer is preferable for a recording and reproducing operation of the second recording layer.

The recording layer management information of each layer is updated each time recording is performed on each layer. Accordingly, in the case of a write-once type, update information is added in the recording management area. Therefore, this area is required to secure sufficiently. In the case of a rewritable type, update information may be added, or old data may be rewritten.

Next, a procedure of updating the recording layer management information will be described. When recording is performed on the first recording layer, for example, a set of start and end addresses among addresses used for the recording and a used area number is recorded as recording layer management information in the recording management areas of the first and second recording layers. When recording is performed on the second recording layer, for example, a set of start and end addresses among used addresses and a used area number is recorded as recording layer management information in the recording management area of the second recording layer. A similar operation is performed when recording layer management information containing position information or time information is used.

In the case of recording layer management information in a bit map form, when recording is performed on the first recording layer, for example, a desired bit of a bit map equivalent to an ECC block used for recording is changed and updated to "1", and recorded as recording layer management information in the recording management areas of the first and second recording layers. When recording is performed on the second recording layer, for example, similarly, a desired bit of a bit map equivalent to an ECC block used for recording is changed and updated to "1", and recorded as recording layer management information in the recording management area of the second recording layer.

Next, a procedure of updating defect management information will be described. When recording or reproducing is performed on the first recording layer and a defect unusable for recording or reproducing is found, for example, a set of defect start and end addresses among addresses containing the defect and an area number in which a defect is present is recorded as defect management information in the recording management areas of the first and second recording layers. When recording or reproducing is performed on the second recording layer and a defect unusable for recording or reproducing is found, for example, a set of defect start and end addresses among addresses containing the defect and an area number in which a defect exists is recorded as defect management information in the recording management area of the second recording layer. A similar operation is performed when defect management information containing position information or time information is used.

In the case of recording defect management information in a bit map form, when recording or reproducing is performed on the first recording layer and a defect unusable for recording or reproducing is found, for example, a desired bit of a bit map equivalent to an ECC block in which a defect exists is changed and updated to "1", and recorded as defect management information in the recording management areas of the first and second recording layers. When recording or reproducing is performed on the second recording layer and a defect unusable for recording or reproducing is found, for example, similarly, a desired bit of a bit map equivalent to an ECC block in which a defect exists is changed and updated to "1", and recorded as defect management information in the recording management area of the second recording layer.

As described above, an address is allocated to each track of the optical disk 51 by a predetermined address imparting method. Thus, after an address can be checked, a radius of each track on the optical disk can be established. In a medium constituted by stacking a plurality of recording layers, the stacking of the recording layers is carried out highly accurately, and thus disk decentration (decentering) shifting of each recording layer is very small. Accordingly, a track radius of a certain address of the second recording layer 14 is substantially equal to that of a corresponding address of the first recording layer 12. Thus, when a predetermined track of the second recording layer 14 is specified, the device 50 can check a recording state of a track by specifying the track in a corresponding position of the first recording layer 12 through an address and checking recording layer management information.

During recording or reproducing, first, based on a command from the controller 110, an address of a track of the second recording layer 14 for performing recording is established. Next, the control area 21 of the second recording layer 14 is checked, and whether a recording state of a track included in the area 27 of the first recording layer 12 stacked on an upper part of an area of the second recording layer 14 in which recording is performed is recorded or unrecorded, is checked. Next, based on the checking, a laser beam output is properly changed to a predetermined output, and recording or reproducing is performed on the second recording layer 14. Accordingly, during the recording or reproducing on the second recording layer 14, optimal transmitted light intensity is obtained, making it possible to perform stable recording or reproducing. Correction conditions in this case can be decided beforehand in accordance with the constitution of the optical disk 51. Thus, the conditions may be prerecorded in the control area 21 of the second recording layer 14, or prestored in the device 50.

If the checked recording state of the area 27 indicates a mixture of recorded and unrecorded parts, the following is carried out. When recording is performed, the recording is carried out by moving to an alternative (substitute) area which is an unrecorded part. Thus, it is possible to prevent irregular recording. On the other hand, when reproducing is performed, first, pseudo recording is carried out in the unrecorded part of the area of the mixture to eliminate the mixed state. Next, reproducing is carried out by changing a laser beam to a predetermined output. Thus, the second recording layer 14 is irradiated with a transmitted light of uniform intensity to perform stable reproducing, making it possible to suppress a reproducing failure which has conventionally been a problem. For the pseudo recording, it is advisable to a specific pattern signal prerecorded in the pseudo data generation circuit 105.

Furthermore, as another recording method, first, pseudo recording is performed in the unrecorded part of the mixed area to eliminate the mixed state. Next, recording is carried out by changing a laser beam to a predetermined output. Thus, the second recording layer 14 is irradiated with a transmitted light of uniform intensity to perform stable recording, making it possible to suppress irregular recording and recording loss which have conventionally been problems. For the pseudo recording, as in the case of the aforementioned reproducing method, it is advisable to use a specific pattern signal prerecorded in the pseudo data generation circuit 105.

EMBODIMENTS

To check effectiveness of the present invention, media of the following Embodiments 1 to 16 were manufactured and tested. The Embodiments 1 to 16 are concrete embodiments of the optical information recording/reproducing media of the first to fourth embodiments, and the optical information recording/reproducing devices of the embodiments, and modified embodiments accompanied by various changes. The Embodiments 1 to 6, the Embodiments 7 to 11, and the Embodiments 12 to 16 use the same recording and reproducing media and the same recording and reproducing devices.

Embodiment 1

Figure 8:
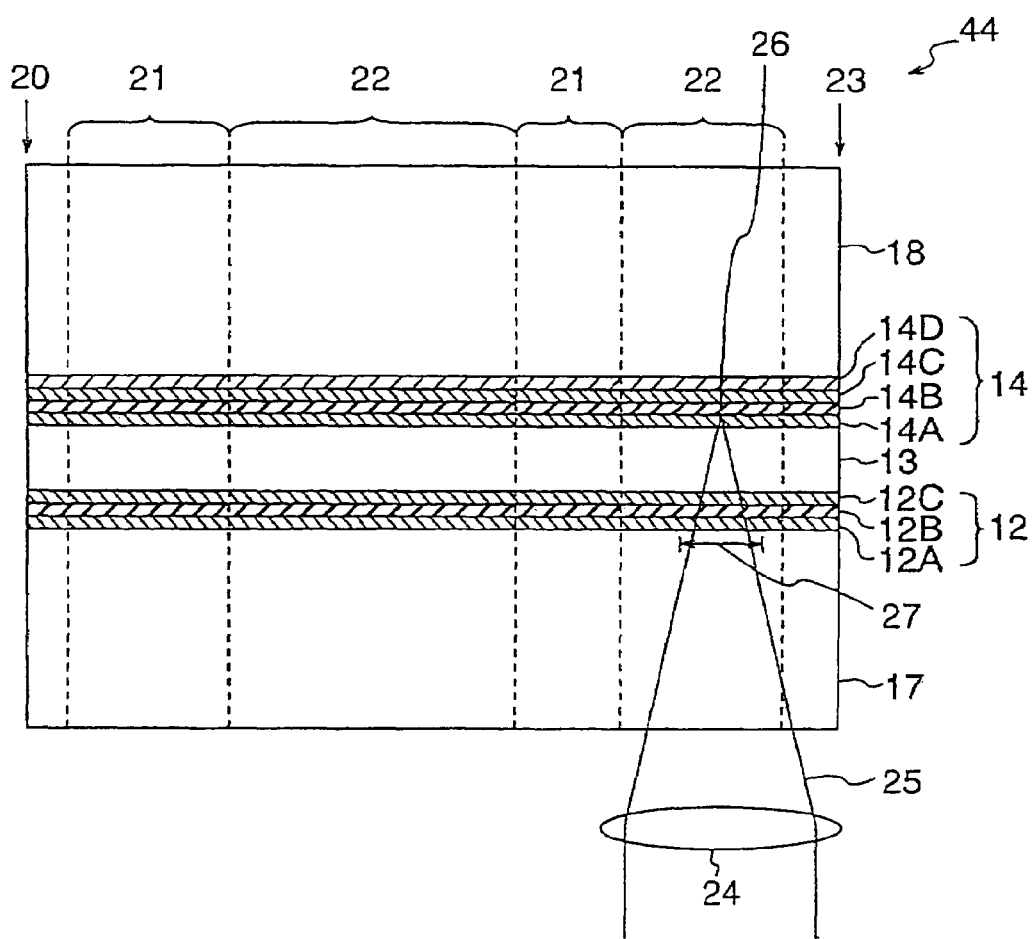
FIG. 8 is a sectional view showing a constitution of an optical information recording and reproducing medium according to Embodiment 1.

FIG. 8 is a sectional view showing a constitution of an optical information recording/reproducing medium of the embodiment. A medium 44 has a constitution in which two substrates having recording layers formed on surfaces are set to face each other and stuck together through an ultraviolet curing resin having a predetermined thickness.

That is, as a first substrate 17, a polycarbonate resin substrate having an outer diameter of 120 mm, an inner diameter of 15 mm, and a substrate thickness of 0.6 mm was used. For the first substrate 17, a substrate in which a wobbling groove 31 shown in FIG. 6 was formed beforehand by mastering was used. A shape of the wobbling groove 31 had a depth of 60 nm and a track pitch of 0.74 µm. The wobbling groove 31 was spiral and formed so as to achieve a wobbling frequency of 700 kHz when it was rotated from the inner periphery to the outer periphery of the first substrate 17 at a linear velocity of 3.9 m/sec. A radius 22 mm to 24 mm of the first substrate 17 was set as a control area 21, and a radius 24 mm to 58 mm of its outside was set as a data recording area 22. Pre-designated addresses were allocated to tracks of the control area 21 and the data recording area 22 in accordance with the aforementioned method.

As a first recording layer 12, a lower protective film 12A made of $ZnS$—$SiO_2$, a phase change recording film 12B made of GeSbTe, and an upper protective film 12C made of $ZnS$—$SiO_2$ were sequentially formed on the first substrate 17 by sputtering method.

As a second substrate 18, a polycarbonate resin substrate having an outer diameter of 120 mm, an inner diameter of 15 mm, and a substrate thickness of 0.6 mm was used. A wobbling groove 31 was formed on a surface of the second substrate 18 by mastering, and formed into a spiral shape reverse to that of the wobble groove 31 formed in the surface of the first substrate 17. A depth, a track pitch, and a wobbling frequency of the wobbling groove 31 of the second substrate 18, and constitution of a control area 21 and data recording area 22, and the like were similar to those of the first substrate 17.

As a second recording layer 14, a reflective film 14D made of Al—Ti, an upper protective film 14C made of $ZnS$—$SiO_2$, a phase change recording film 14B made of GeSbTe, and a lower protective film 14A made of $ZnS$—$SiO_2$ were sequentially formed on the second substrate 18 by sputtering method.

Next, as a spacer layer 13, an ultraviolet curing resin was developed with a thickness of 40 µm on the first recording layer 12 by spin-coating method. Subsequently, the first and second recording layers 12 and 14 were set to face each other, the first and second substrates 17 and 18 were stuck together by suppressing decentrations thereof, and the ultraviolet curing resin was cured by ultraviolet rays.

Subsequently, all of data recording areas of the first and second recording layers 12 and 14 in which recording would be performed were initialized by using an initialization device. That is, by setting a crystal state which was an initial state equivalent to non-recording, the medium 44 was formed. As in the case of the medium 10 of the first embodiment, recording layer management information and defect management information of the first recording layer 12 were stored in the first and second recording layers 12 and 14.

Optical characteristics of the medium 44 of the embodiment were measured. When a laser beam having a wavelength of 650 nm was applied from the first substrate 17 side, in the case of the first recording layer 12 alone, in a crystal state of an unrecorded time, a reflectance was 10% and a transmittance was 50% and in an amorphous state of an recorded time, a reflectance was 2.5% and a transmittance was 72%. In the case of the second recording layer 14 alone, a reflectance was 12% in a crystal state of an unrecorded time, and a reflectance was 30% in an amorphous state of a recorded time.

Under similar conditions, for the medium 44, a reflectance from the second recording layer 14 was 3% when the second and first recording layers 14 and 12 were unrecorded. However, after the first recording layer 12 was recorded, the reflectance from the second recording layer 14 was about 4.5%. Additionally, a reflectance from the second recording layer 14 was 7.5% after the second recording layer 14 was recorded while the first recording layer 12 was unrecorded. However, after the first recording layer 12 was recorded, the reflectance from the second recording layer 14 was about 11%.

Recording was tried on the medium 44 by using an optical head for a phase change recording medium. A laser beam wavelength of the optical head was 650 nm, and NA of a condenser lens was 0.65. For the recording, the device 50 of the embodiment described above with reference to FIG. 7 was used.

To begin with, data was recorded in the data recording area 22 of a radius 30 mm to 32 mm of the first recording layer 12. In this case, in accordance with the aforementioned procedure, information indicating that addresses (address 69680 hex to address 7E2DF hex) allocated to the radius 30 mm to 32 mm of the first recording layer 12 had been recorded was recorded in the control area 21 of the second recording layer 14.

Subsequently, a host transmitted a command for performing recording in the radius 30.5 mm to 31.2 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30 to 32 mm of the first recording layer 12, and transmitted the status data to the controller 110. Next, by a command from the controller 110, a focus of a laser beam of the optical head 52 was moved to a position of the radius 30.5 mm of the second recording layer 14. Subsequently, the controller 110 transmitted a command for reducing a laser beam output (recording power) from an initial value 12 mW to 10 mW to the recording power setting circuit 106. By such a series of operations or the like, good recording was carried out for the radius 30.5 mm to 31.2 mm which was a desired area.

As described above, it was possible to check that when the first recording layer 12 was in the recorded state, good recording was carried out on the second recording layer 14 by reducing the laser beam output.

Embodiment 2

Reproducing was tried from the second recording layer 14 by using the medium 44 of the Embodiment 1, and the device 50 of the embodiment.

To begin with, data was recorded in the data recording area 22 of a radius 30 mm to 32 mm of the second recording layer 14. Next, data was recorded in the data recording area 22 of the radius 30.5 mm to 31.5 mm of the first recording layer 12. In this case, in accordance with the aforementioned procedure, information indicating that addresses (address 6ED90 hex to address 79BDF hex) allocated to the radius 30.5 mm to 31.5 mm of the first recording layer 12 had been recorded was recorded in the control area 21 of the second recording layer 14.

Subsequently, a host transmitted a command for performing reproducing in a position of the radius 31 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30.5 to 31.5 mm of the first recording layer 12, and transmitted the status data to the controller 110. Next, by a command from the controller 110, a focus of a laser beam of the optical head 52 was moved to a position of the radius 30.5 mm of the second recording layer 14. Subsequently, the controller 110 transmitted a command for reducing a laser beam output (reproducing power) from an initial value 1.2 mW to 1.0 mW to the reproducing power setting circuit 107. By such a series of operations or the like, a good reproducing signal was obtained from the radius 31 mm which was a desired area.

As described above, it was possible to check that when the first recording layer 12 was in the recorded state, good reproducing was carried out from the second recording layer 14 by reducing the laser beam output.

Embodiment 3

Recording was tried on the second recording layer 14 by using the medium 44 of the Embodiment 1, and the device 50 of the embodiment.

To begin with, data was recorded in the data recording area 22 of a radius 30 mm to 32 mm of the first recording layer 12. In this case, in accordance with the aforementioned procedure, information indicating that addresses (address 69680 hex to address 7E2DF hex) allocated to the radius 30 mm to 32 mm of the first recording layer 12 had been recorded was recorded in the control area 21 formed in the inner periphery of the first recording layer 12.

Subsequently, a host transmitted a command for performing recording in the radius 31.8 to 32.2 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30 mm to 32 mm of the first recording layer 12, and transmitted the status data to the controller 110.

Next, since the radius 31.8 mm to 32.0 mm of the first recording layer 12 was in a recorded state, that is, the area 27 of the first recording layer stacked on an upper part of a recording target part 26 was set in a mixed state when recording was performed in the radius area of the second recording layer 14, the controller 110 canceled the recording, and moved the recording position to a position of the radius 34.8 mm which was an alternative (substitute) area. Next, reproducing was performed again in the control area 21 of the second recording layer 14. The recording layer management information-reproducing circuit 109 recognized that a state is an unrecorded state in the radius 34.5 mm to 35.5 mm of the first recording layer 12, and transmitted the status data to the controller 110. Subsequently, the controller 110 transmitted a command for setting a laser beam output (recording power) to an initial value 12 mW to the recording power setting circuit 106. By such a series of operations or the like, good recording was carried out in the radius of 34.8 mm to 35.2 mm which was an alternative (substitute) area.

As described above, it was possible to check that when the area 27 of the first recording layer 12 was set in the mixed state, good recording was carried out on the second recording layer 14 by moving to the alternative (substitute) area to perform recording.

Embodiment 4

Reproducing was tried from the second recording layer 14 by using the medium 44 of the Embodiment 1, and the device 50 of the embodiment.

To begin with, data was recorded in the data recording area 22 of a radius 30 mm to 32 mm of the second recording layer 14. Next, data was recorded in the data recording area 22 of the radius 30.5 mm to 31.5 mm of the first recording layer 12. In this case, in accordance with the aforementioned procedure, information indicating that addresses (address 6ED90 hex to address 79BDF hex) allocated to the radius 30.5 mm to 31.5 mm of the first recording layer 12 had been recorded was recorded in the control area 21 of the second recording layer 14.

Subsequently, a host transmitted a command for performing reproducing in the radius 30.3 mm to 30.7 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30.5 to 31.5 mm of the first recording layer 12, and transmitted the status data to the controller 110. Next, by a command from the controller 110, a focus of a laser beam of the optical head 52 was moved to a position of the radius 30.0 mm of the first recording layer 12. Subsequently, pseudo data recording was performed in the radius 30.0 mm to 30.5 mm. For the pseudo data recording, data transmitted from the pseudo data generation circuit 105 to the recording data processing circuit 104 was used.

Next, by a command from the controller 110, a focus of the laser beam of the optical head 52 was moved to the second recording layer 14. Subsequently, the controller 110 transmitted a command for reducing a laser beam output (reproducing power) from an initial value 1.2 mW to 1.0 mW to the reproducing power setting circuit 107. By such a series of operations or the like, a good reproducing signal was obtained from the radius 30.3 mm to 30.7 mm which was a desired area.

As described above, it was possible to check that when the area 27 of the first recording layer 12 was in the mixed state, good reproducing was carried out from the second recording layer 14 by recording the pseudo data in the unrecorded part.

Embodiment 5

Recording was tried on the second recording layer 14 by using the medium 44 of the Embodiment 1, and the device 50 of the embodiment.

To begin with, data was recorded in the data recording area 22 of a radius 30 mm to 31 mm of the second recording layer 14. Next, data was recorded in the data recording area 22 of the radius 30.5 mm to 31.5 mm of the first recording layer 12. In this case, in accordance with the aforementioned procedure, information indicating that addresses (address 6ED90 hex to address 79BDF hex) allocated to the radius 30.5 mm to 31.5 mm of the first recording layer 12 had been recorded was recorded in the control area 21 of the second recording layer 14.

Subsequently, a host transmitted a command for performing recording in a position of the radius 31 mm to 32 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30.5 to 31.5 mm of the first recording layer 12, and transmitted the status data to the controller 110. Next, by a command from the controller 110, a focus of a laser beam of the optical head 52 was moved to a position of the radius 31.5 mm of the first recording layer 12. Subsequently, pseudo data recording was performed in the radius 31.5 mm to 32.0 mm. For the pseudo data recording, data transmitted from the pseudo data generation circuit 105 to the recording data processing circuit 104 was used.

Next, by a command from the controller 110, a focus of the laser beam of the optical head 52 was moved to the second recording layer 14. Subsequently, the controller 110 transmitted a command for reducing a laser beam output (recording power) from an initial value 12 mW to 10 mW to the recording power setting circuit 106. By such a series of operations or the like, good recording was carried out in the radius 31.0 mm to 32.0 mm which was a desired area.

As described above, it was possible to check that when the area 27 of the first recording layer 12 was in the mixed state, good recording was carried out on the second recording layer 14 by recording the pseudo data in the unrecorded part.

Embodiment 6

A recording and reproducing operation was tried by using the medium 44 of the Embodiment 1, and the device 50 of the embodiment when there was an area having a defect in the first recording layer 12.

To begin with, data was recorded in the data recording area 22 of a radius 30 mm to 32 mm of the first recording layer 12. Subsequently, reproducing was carried out in the radius 30 mm to 32 mm of the first recording layer 12. However, data reproducing was difficult in the area of the radius 31.6 mm to 31.7 mm. In other words, the area of the radius 31.6 mm to 31.7 mm was a defective area. Thus, information indicating that addresses (address 69680 hex to address 7E2DF hex) allocated to the radius 30 mm to 32.0 mm of the first recording layer 12 were recorded, and defective area information indicating that the area of the radius 31.6 mm to 31.7 mm of the first recording layer 12 was the defective area, were recorded in the control area 21 of the second recording layer 14.

Subsequently, a host transmitted a command for performing recording in the radius 31.5 mm to 31.8 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30 to 32 mm of the first recording layer 12 and the radius 31.6 mm to 31.7 mm of the first recording layer 12 is a defective area, and transmitted the status data to the controller 110.

Next, since the radius 31.6 mm to 31.7 mm of the first recording layer 12 was the defective area, the controller 110 cancelled recording on the second recording layer 14 near the area, and moved the recording position to a position of a radius 34.5 mm which was an alternative (substitute) area. Next, reproducing was performed again in the control area 12 of the second recording layer 14. The recording layer management information-reproducing circuit 109 recognized that a state is an unrecorded state in the radius 34.2 mm to 35.1 mm of the first recording layer 12, and transmitted the status data to the controller 110. The controller 110 transmitted a command for setting a laser beam output (recording power) to an initial value 12 mW to the recording power setting circuit 106. By such a series of operations or the like, good recording was carried out in the radius 34.5 mm to 34.8 mm which was the alternative (substitute) area.

As described above, it was possible to check that when there was a defect in the first recording layer 12, good recording was carried out on the second recording layer 14 by moving to the alternative area.

Embodiment 7

Figure 9:
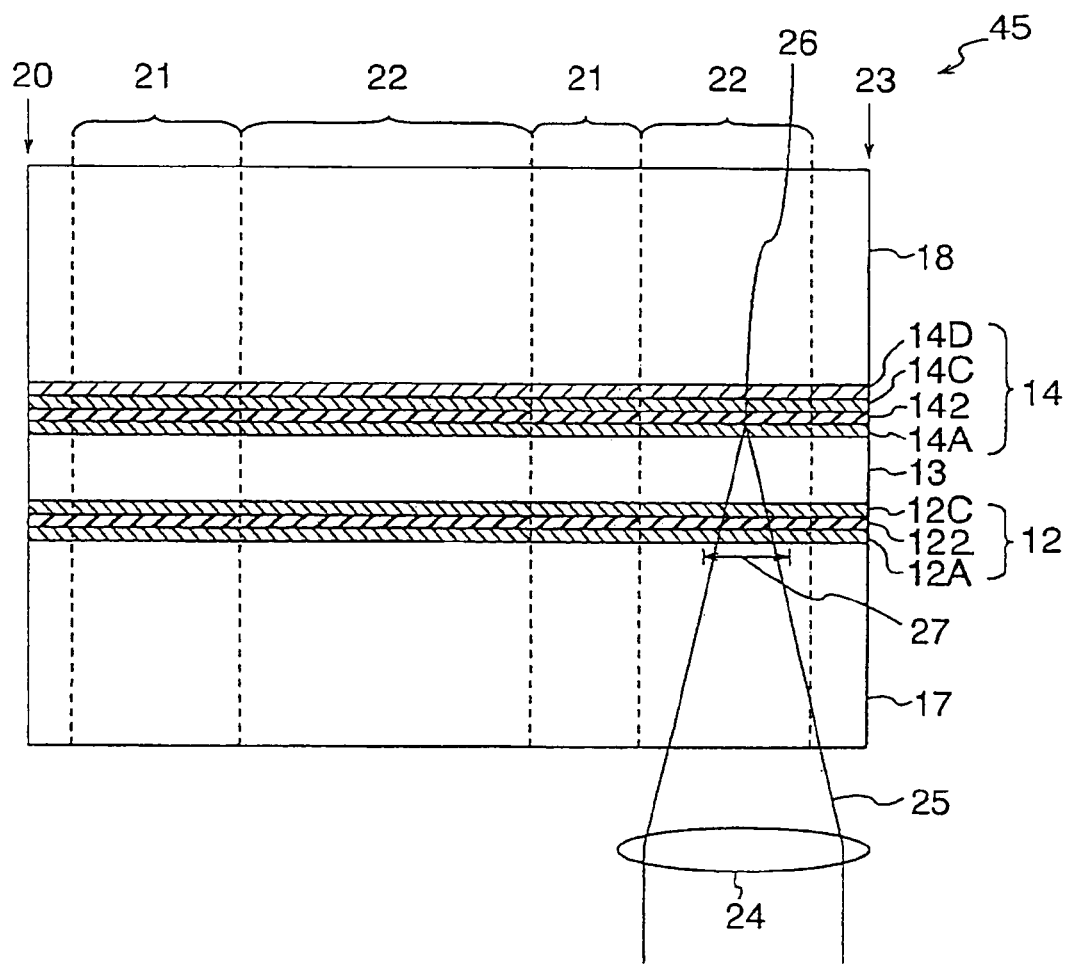
FIG. 9 is a sectional view showing a constitution of an optical information recording and reproducing medium according to Embodiment 7.

FIG. 9 is a sectional view showing a constitution of an optical information recording and reproducing medium of the embodiment. The optical information recording and reproducing medium of the embodiment is a write-once type medium 45, and has a constitution similar to that of the medium 44 of the Embodiment 1 except for a difference of the constitution of the first and second recording layers 12 and 14.

That is, as a first recording layer 12, a lower protective film 12A made of $ZnS—SiO_2$, a write-once type recording film 122 made of a TeSn based alloy, and an upper protective film 12C made of $ZnS—SiO_2$ were sequentially formed on a substrate 11 by sputtering method. As a second recording layer 14, a reflective film 14D made of Al—Ti, an upper protective film 14C made of $ZnS—SiO_2$, a write-once type recording film 142 made of a TeSn based alloy, and a lower protective film 14A made of $ZnS—SiO_2$ were sequentially formed on a second substrate 18 by sputtering method.

Optical characteristics of the medium of the embodiment were measured. When a laser beam having a wavelength of 650 nm was applied from the first substrate 17 side, in the case of the first recording layer 12 alone, in an unrecorded case, a reflectance was 6% and a transmittance was 70%. In a recorded case, in an area in which a write-once type recording mark was formed, average reflectance was 8% and average transmittance was 60%. In the case of the second recording layer 14 alone, a reflectance was 16% in an unrecorded case, and an average reflectance was 21% in a recorded case.

Under similar conditions, for the medium of the embodiment, a reflectance from the second recording layer 14 was 7.8% when the second and first recording layers 14 and 12 were in unrecorded states. However, after the first recording layer 12 was recorded, the reflectance from the second recording layer 14 was about 5.85%. Additionally, a reflectance from the second recording layer 14 was 10.3% when the second recording layer 14 was recorded while the first recording layer 12 was unrecorded. However, after the first recording layer 12 was recorded, the reflectance from the second recording layer 14 was about 7.6%.

Recording was tried on the medium of the embodiment by using an optical head for a write-once type recording medium. A laser beam wavelength of the optical head was 650 nm, and NA of a condenser lens was 0.65. For the recording, the device 50 of the embodiment described above with reference to FIG. 7 was used.

To begin with, data was recorded in the data recording area 22 of a radius 30 mm to 32 mm of the first recording layer 12. In this case, in accordance with the aforementioned procedure, information indicating that addresses (address 69680 hex to address 7E2DF hex) allocated to the radius 30 mm to 32 mm of the first recording layer 12 had been recorded was recorded in the control area 21 of the second recording layer 12.

Subsequently, a host transmitted a command for performing recording in the radius 30.5 mm to 31.2 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30 to 32 mm of the first recording layer 12, and transmitted the status data to the controller 110. Next, by a command from the controller 110, a focus of a laser beam of the optical head 52 was moved to a position of the radius 30.5 mm of the second recording layer 14. Subsequently, the controller 110 transmitted a command for increasing a laser beam output (recording power) from an initial value 6 mW to 7 mW to the recording power setting circuit 106. By such a series of operations or the like, good recording was carried out for the radius 30.5 mm to 31.2 mm which was a desired area.

As described above, it was possible to check that in the write-once type medium, when the first recording layer 12 was in the recorded state, good recording was carried out on the second recording layer 14 by increasing the laser beam output.

Embodiment 8

Reproducing was tried from the second recording layer 14 by using the medium of the Embodiment 7, and the device 50 of the embodiment.

To begin with, data was recorded in the data recording area 22 of a radius 30 mm to 32 mm of the second recording layer 14. Next, data was recorded in the data recording area 22 of the radius 30.5 mm to 31.5 mm of the first recording layer 12. In this case, in accordance with the aforementioned procedure, information indicating that addresses (address 6ED90 hex to address 79BDF hex) allocated to the radius 30.5 mm to 31.5 mm of the first recording layer 12 had been recorded was recorded in the control area 21 of the second recording layer 14.

Subsequently, a host transmitted a command for performing reproducing in a position of the radius 31 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30.5 to 31.5 mm of the first recording layer 12, and transmitted the status data to the controller 110. Next, by a command from the controller 110, a focus of a laser beam of the optical head 52 was moved to a position of the radius 30.5 mm of the second recording layer 14. Subsequently, the controller 110 transmitted a command for increasing a laser beam output (reproducing power) from an initial value 0.6 mW to 0.7 mW to the reproducing power setting circuit 107. By such a series of operations or the like, a good reproducing signal was obtained from the radius 31 mm which was a desired area.

As described above, it was possible to check that in the write-once type medium, when the first recording layer 12 was in the recorded state, good reproducing was carried out from the second recording layer 14 by increasing the laser beam output.

Embodiment 9

Recording was tried on the second recording layer 14 by using the medium of the Embodiment 7, and the device 50 of the embodiment.

To begin with, data was recorded in the data recording area 22 of a radius 30 mm to 32 mm of the first recording layer 12. In this case, in accordance with the aforementioned procedure, information indicating that addresses (address 69680 hex to address 7E2DF hex) allocated to the radius 30 mm to 32 mm of the first recording layer 12 had been recorded was recorded in the control area 21 of the second recording layer 12.

Subsequently, a host transmitted a command for performing recording in the radius 31.8 to 32.2 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30 mm to 32 mm of the first recording layer 12, and transmitted the status data to the controller 110. Next, since the radius 31.8 mm to 32.0 mm of the first recording layer 12 was in a recorded state, that is, an area 27 of a recording target part 26 was set in a mixed state when recording was performed in the radius area of the second recording layer 14, the controller 110 canceled the recording on the second recording layer 14 near the area, and moved the recording position to a position of the radius 34.8 mm which was an alternative (substitute) area.

Next, reproducing was performed again in the control area 21 of the second recording layer 14. The recording layer management information-reproducing circuit 109 recognized that a state is an unrecorded state in the radius 34.5 mm to 35.5 mm of the first recording layer 12, and transmitted the status data to the controller 110. Subsequently, the controller 110 transmitted command data for setting a laser beam output (recording power) to an initial value 6 mW to the recording power setting circuit. By such a series of operations or the like, good recording was carried out in the area 34.8 mm to 35.2 mm which was an alternative (substitute) area.

As described above, it was possible to check that in the write-once type medium, when the area 27 of the first recording layer 12 was set in the mixed state, good recording was carried out on the second recording layer 14 by moving to the alternative (substitute) area to perform recording.

Embodiment 10

Reproducing was tried from the second recording layer 14 by using the medium of the Embodiment 7, and the device 50 of the embodiment.

To begin with, data was recorded in the data recording area 22 of a radius 30 mm to 32 mm of the second recording layer 14. Next, data was recorded in the data recording area 22 of the radius 30.5 mm to 31.5 mm of the first recording layer 12. In this case, in accordance with the aforementioned procedure, information indicating that addresses (address 6ED90 hex to address 79BDF hex) allocated to the radius 30.5 mm to 31.5 mm of the first recording layer 12 had been recorded was recorded in the control area 21 of the second recording layer 14.

Subsequently, a host transmitted a command for performing reproducing in the radius 30.3 mm to 30.8 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30.5 to 31.5 mm of the first recording layer 12, and transmitted the status data to the controller 110. Next, by a command from the controller 110, a focus of a laser beam of the optical head 52 was moved to a position of the radius 30.0 mm of the first recording layer 12. Subsequently, pseudo data recording was performed in the radius 30.0 mm to 30.5 mm. For the pseudo data recording, data transmitted from the pseudo data generation circuit 105 to the recording data processing circuit 104 was used.

Next, by a command from the controller 110, a focus of the laser beam of the optical head 52 was moved to the second recording layer 14. Subsequently, the controller 110 transmitted a command for increasing a laser beam output (reproducing power) from an initial value 0.6 mW to 0.7 mW to the reproducing power setting circuit 107. By such a series of operations or the like, a good reproducing signal was obtained from the radius 30.3 mm to 30.8 mm which was a desired area.

As described above, it was possible to check that in the write-once type medium, when the area 27 of the first recording layer 12 was in the mixed state, good reproducing was carried out from the second recording layer 14 by recording the pseudo data in the unrecorded part.

Embodiment 11

Recording was tried on the second recording layer 14 by using the medium of the Embodiment 7, and the device 50 of the embodiment.

To begin with, data was recorded in the data recording area 22 of a radius 30.0 mm to 31.0 mm of the second recording layer 14. Next, data was recorded in the data recording area 22 of the radius 30.5 mm to 31.5 mm of the first recording layer 12. In this case, in accordance with the aforementioned procedure, information indicating that addresses (address 6ED90 hex to address 79BDF hex) allocated to the radius 30.5 mm to 31.5 mm of the first recording layer 12 had been recorded was recorded in the control area 21 of the second recording layer 14.

Subsequently, a host transmitted a command for performing recording in a position of the radius 31.0 mm to 32.0 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state of the radius 30.5 to 31.5 mm of the first recording layer 12, and transmitted the status data to the controller 110. Next, by a command from the controller 110, a focus of a laser beam of the optical head 52 was moved to a position of the radius 31.5 mm of the first recording layer 12. Subsequently, pseudo data recording was performed in the radius 31.5 mm to 32.0 mm. For the pseudo data recording, data transmitted from the pseudo data generation circuit 105 to the recording data processing circuit 104 was used.

Next, by a command from the controller 110, a focus of the laser beam of the optical head 52 was moved to the second recording layer 14. Subsequently, the controller 110 transmitted a command for increasing a laser beam output (recording power) from an initial value 6 mW to 7 mW to the recording power setting circuit 106. By such a series of operations or the like, good recording was carried out in the radius 31.0 mm to 32.0 mm which was a desired area.

As described above, it was possible to check that in the write-once type medium, when the area 27 of the first recording layer 12 was in the mixed state, good recording was carried out on the second recording layer 14 by recording the pseudo data in the unrecorded part.

Embodiment 12

An optical information recording and reproducing medium of the embodiment is a concrete embodiment of the optical information recording and reproducing medium of the second embodiment described above with reference to FIG. 2. That is, as a substrate 11, a polycarbonate resin substrate having an outer diameter of 120 mm, an inner diameter of 15 mm, and a substrate thickness of 0.6 mm was used. For the substrate 11, a substrate in which a wobbling groove 31 shown in FIG. 6 was formed beforehand by mastering was used. A shape of the wobbling groove 31 had a depth of 35 nm and a track pitch of 0.30 μm. The wobbling groove 31 was spiral and formed so as to achieve a wobbling frequency of 800 kHz when it was rotated from the inner periphery to the outer periphery of the substrate 11 at a linear velocity of 5.0 m/sec. A radius 22 mm to 24 mm of the substrate 11 was set as a control area 21, and a radius 24 mm to 58 mm of its outside was set as a data recording area 22. Pre-designated addresses were allocated to the control area 21 and the data recording area 22 for each track of the wobbling groove 31 in accordance with the aforementioned predetermined method.

As a second recording layer 14, a reflective film 14D made of Al—Ti, an upper protective film 14C made of ZnS—SiO$_2$, a phase change recording film 14B made of GeSbTe, and a lower protective film 14A made of ZnS—SiO$_2$ were sequentially formed on the substrate 11 by sputtering method.

Next, as a spacer layer 13, an ultraviolet curing resin was developed with a thickness of 15 μm on the second recording layer 14, and a wobbling groove 31 having a shape similar to that of the wobbling groove 31 formed on a surface of the substrate 10 was formed on a surface of the ultraviolet curing resin by using a stamper. A depth, a track pitch, and a wobbling frequency of the wobbling groove 31 on the surface of the spacer layer 13, and a constitution of the control area 21 and data recording area 22, and the like were similar to those of the substrate 11. The ultraviolet curing resin was irradiated with ultraviolet rays to be cured, and then the stamper was removed.

Subsequently, as a first recording layer 12, an upper protective film 12C made of ZnS—SiO$_2$, a phase change recording film 12B made of GeSbTe, and a lower protective film 12A made of ZnS—SiO$_2$ were sequentially formed on the spacer layer 13 by sputtering method.

Subsequently, as a cover layer 15, a polycarbonate cover film having a thickness of 90 μm was bonded on the second recording layer 14 by an ultraviolet curing resin. In this case, a thickness of adding together the cover film and the ultraviolet curing resin was 95 μm.

Subsequently, full surfaces of data recording areas of the first and second recording layers 12 and 1.4 in which recording was performed were initialized by using an initialization device. That is, by setting a crystal state which was an initial state equivalent to non-recording, the medium of the embodiment was formed.

Optical characteristics of the medium of the embodiment were measured. When a laser beam having a wavelength of 405 nm was applied from the substrate 11 side, in the case of the first recording layer 12 alone, reflectance for un-recorded crystal state was 5% and transmittance was 60%. Reflectance for recorded amorphous state was 13% and transmittance was 45%. In the case of the second recording layer 14 alone, reflectance was 13% for un-recorded crystal state, and reflectance was 35% for recorded amorphous state.

Under similar conditions, for the medium 40, a reflectance from the second recording layer 14 was 4.7% when the second and first recording layers 14 and 12 were unrecorded. However, after the first recording layer 12 was recorded, the reflectance from the second recording layer 14 was about 3.6%. Additionally, a reflectance from the second recording layer 14 was 12.6% when the second recording layer 14 was recorded while the first recording layer 12 was unrecorded. However, after the first recording layer 12 was recorded, the reflectance from the second recording layer 14 was about 9.7%.

Recording was tried on the medium of the embodiment by using an optical head for a phase change recording medium. A laser beam wavelength of the optical head was 405 nm, and NA of a condenser lens was 0.85. For the recording, the device 50 of the embodiment described above with reference to FIG. 7 was used.

To begin with, data was recorded in the data recording area 22 of a radius 30 mm to 31 mm of the first recording layer 12. In this case, in accordance with the aforementioned procedure, information indicating that addresses (address 168800 hex to address 1A317F hex) allocated to the radius 30 mm to 31 mm of the first recording layer 12 had been recorded was recorded in the control area 21 of the second recording layer 14.

Subsequently, a host transmitted a command for performing recording in the radius 30.3 mm to 30.7 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30 to 31 mm of the first recording layer 12, and transmitted the status data to the controller. Next, by a command from the controller 110, the recording position was moved to a position of the radius 30.3 mm of the second recording layer 14. Subsequently, the controller 110 transmitted a command for increasing a laser beam output (recording power) from an initial value 4 mW to 5 mW to the recording power setting circuit 106. By such a series of operations or the like, good recording was carried out for the radius 30.3 mm to 30.7 mm which was a desired area.

As described above, it was possible to check that in the medium 40 of the second embodiment, when the first recording layer 12 was in the recorded state, good recording was carried out on the second recording layer 14 by increasing the laser beam output.

Embodiment 13

Reproducing was tried from the second recording layer 14 by using the medium of the Embodiment 12, and the device 50 of the embodiment.

To begin with, data was recorded in the data recording area 22 of a radius 30 mm to 31 mm of the second recording layer 14. Next, data was recorded in the data recording area 22 of the radius 30.2 mm to 30.8 mm of the first recording layer 12. In this case, in accordance with the aforementioned procedure, information indicating that addresses (address 174380 hex to address 1975FF hex) allocated to the radius 30.2 mm to 30.8 mm of the first recording layer 12 had been recorded was recorded in the control area 21 of the second recording layer.

Subsequently, a host transmitted a command for performing reproducing in a position of the radius 30.5 mm of the data recording area 22 of the second recording layer 14. In accordance with the aforementioned procedure, the device 50 first performed reproducing in the control area. 21 of the second recording layer 14. The recording layer management information-reproducing circuit 109 recognized that a state is a recorded state in the radius 30.2 to 30.8 mm of the first recording layer 12, and transmitted the status data to the controller 110. Next, by a command from the controller 110, a focus of a laser beam of the optical head 52 was moved to a position of the radius 30.5 mm of the second recording layer 14. The controller 110 transmitted a command for increasing a laser beam output (reproducing power) from an initial value 0.4 mW to 0.5 mW to the reproducing power setting circuit 107. By such a series of operations or the like, a good reproducing signal was obtained from the radius 30.5 mm which was a desired area.

As described above, it was possible to check that in the medium 40 of the second embodiment, when the first recording layer 12 was in the recorded state, good reproducing was carried out from the second recording layer 14 by increasing the laser beam output.

Embodiment 14

Recording was tried on the second recording layer 14 by using the medium of the Embodiment 12, and the device 50 of the embodiment.

To begin with, data was recorded in the data recording area 22 of a radius 30 mm to 31 mm of the first recording layer 12. In this case, in accordance with the aforementioned procedure, information indicating that addresses (address 168800 hex to address 1A317F hex) allocated to the radius 30 mm to 31 mm of the first recording layer 12 had been recorded was recorded in the control area 21 of the second recording layer 12.

Subsequently, a host transmitted a command for performing recording in the radius 30.8 mm to 31.2 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30 mm to 31 mm of the first recording layer 12, and transmitted the status data to the controller 110. Next, since the radius 30.8 mm to 31.0 mm of the first recording layer 12 was in a recorded state, that is, an area 27 of a recording target part 26 was set in a mixed state when recording was performed in the radius area of the second recording layer 14, the controller 110 canceled the recording on the second recording layer 14 near the area, and moved the recording position to a position of the radius 32.0 mm which was an alternative (substitute) area.

Next, reproducing was performed again in the control area 21 of the second recording layer 14. The recording layer management information-reproducing circuit 109 recognized that a state is an unrecorded state in the radius 32.0 mm to 32.4 mm of the first recording layer 12, and transmitted the status data to the controller 110. Subsequently, the controller 110 transmitted command data for setting a laser beam output (recording power) to an initial value 4 mW to the recording power setting circuit. By such a series of operations or the like, good recording was carried out in the radius of 32.0 mm to 32.4 mm which was an alternative (substitute) area.

As described above, it was possible to check that in the medium equivalent to the Embodiment 12, when the area 27 of the first recording layer 12 was set in the mixed state, good recording was carried out on the second recording layer 14 by moving to the alternative (substitute) area to perform recording.

Embodiment 15

Reproducing was tried from the second recording layer 14 by using the medium of the Embodiment 12, and the device 50 of the embodiment.

To begin with, data was recorded in the data recording area 22 of a radius 30 mm to 31 mm of the second recording layer 14. Next, data was recorded in the data recording area 22 of the radius 30.2 mm to 30.8 mm of the first recording layer 12. In this case, in accordance with the aforementioned procedure, information indicating that addresses (address 174380 hex to address 1975FF hex) allocated to the radius 30.2 mm to 30.8 mm of the first recording layer 12 had been recorded was recorded in the control area 21 of the second recording layer 14.

Subsequently, a host transmitted a command for performing reproducing in the radius 30.0 mm to 30.4 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30.2 to 30.4 mm of the first recording layer 12, and transmitted the status data to the controller 110. Next, by a command from the controller 110, a focus of a laser beam of the optical head 52 was moved to a position of the radius 30.0 mm of the first recording layer 12. Subsequently, pseudo data recording was performed in the radius 30.0 mm to 30.2 mm. For the pseudo data recording, data transmitted from the pseudo data generation circuit 105 to the recording data processing circuit 104 was used.

Next, by a command from the controller 110, a focus of the laser beam of the optical head 52 was moved to the second recording layer 14. Subsequently, the controller 110 transmitted a command for increasing a laser beam output (reproducing power) from an initial value 0.4 mW to 0.5 mW to the reproducing power setting circuit 107. By such a series of operations or the like, a good recording signal was obtained from the radius 30.0 mm to 30.4 mm which was a desired area.

As described above, it was possible to check that in the write-once medium, when the area 27 of the first recording layer 12 was in the mixed state, good reproducing was carried out from the second recording layer 14 by recording the pseudo data in the unrecorded part.

Embodiment 16

Recording was tried on the second recording layer 14 by using the medium of the Embodiment 12, and the device 50 of the embodiment.

To begin with, data was recorded in the data recording area 22 of a radius 30.0 mm to 30.5 mm of the second recording layer 14. Next, data was recorded in the data recording area 22 of the radius 30.2 mm to 30.8 mm of the first recording layer 12. In this case, in accordance with the aforementioned procedure, information indicating that addresses (address 174380 hex to address 1975FF hex) allocated to the radius 30.2 mm to 30.8 mm of the first recording layer 12 had been recorded was recorded in the control area 21 of the second recording layer 14.

Subsequently, a host transmitted a command for performing recording in a position of the radius 30.5 mm to 31.0 mm of the data recording area 22 of the second recording layer 14. In accordance with the aforementioned procedure, the device 50 first performed reproducing in the control area 21 of the second recording layer 14. The recording layer management information-reproducing circuit 109 recognized that a state is a recorded state in the radius 30.5 to 30.8 mm of the first recording layer 12, and transmitted the status data to the controller 110. Next, by a command from the controller 110, a focus of a laser beam of the optical head 52 was moved to a position of the radius 30.8 mm of the first recording layer 12. Subsequently, pseudo data recording was performed in the radius 30.8 mm to 31.0 mm. For the pseudo data recording, data transmitted from the pseudo data generation circuit 105 to the recording data processing circuit 104 was used.

Next, by a command from the controller 110, a focus of the laser beam of the optical head 52 was moved to the second recording layer 14. Subsequently, the controller 110 transmitted a command for increasing a laser beam output (recording power) from an initial value 4 mW to 5 mW to the recording power setting circuit 106. By such a series of operations or the like, good recording was carried out in the radius 30.5 mm to 31.0 mm which was a desired area.

As described above, it was possible to check that in the write-once type medium, when the area 27 of the first recording layer 12 was in the mixed state, good recording was carried out on the second recording layer 14 by recording the pseudo data in the unrecorded part.

In the Embodiments 12 to 16, the medium of the constitution shown in FIG. 2, that is, the medium of the constitution in which the thin cover layer was formed on the laser beam incident surface and the substrate having a large thickness was formed on the side opposed to the laser beam incident surface, was combined with the high NA lens, that is, the condenser lens of NA 0.85 and the semiconductor laser beam source of a wavelength 405 nm. However, even in the combination of a medium having a wobbling groove formed on a substrate of a thickness 0.6 mm with a condenser lens of NA 0.65 and a semiconductor laser beam source of a wavelength 405 nm, effects similar to those of the results shown in the Embodiments 12 to 16 were confirmed.

According to the embodiments and the Embodiments, by performing the reproducing in the control area 21 of the second recording layer 14, the recording layer management information and the defect management information regarding the data recording area 22 of the first recording layer 12 were checked. However, there is no need to set great store by the reproduction in the control area 21 of the second recording layer 14. As long as the quickness or the risk is not a problem, reproducing may be directly performed in the control area 21 of the first recording layer 12.

The present invention has been described based on the preferred embodiments. However, the optical information recording and reproducing medium, the recording device, the recording and reproducing device, the reproducing device, the recording method, the recording and reproducing method, and the reproducing method of the invention are not limited to the constitutions of the embodiments. An optical information recording and reproducing medium and the like variously modified and changed from the constitutions of the foregoing embodiments are also within the scope of the invention.

INDUSTRIAL APPLICABILITY

The present invention is suited to an optical information recording and reproducing medium of a phase change type, a write-once type or the like having a plurality of recording layers, and a recording method, a recording and reproducing method, a reproducing method, a recording device, a recording and reproducing device, and a reproducing device of this optical information recording and reproducing medium.

The invention claimed is:

1. An optical information recording and reproducing medium having a plurality of recording layers which allow recording and reproducing by irradiation with a laser beam,
    characterized in that each recording layer comprises a recording area in which user data is recorded, and a recording management area in which recording layer management information containing at least information indicating recording states and defects of a plurality of areas into which the inside of said recording area is divided is recorded, said recording layer management information including target area number, start address of recorded part, end address of recorded part, start address of recoding inhibited part due to defect, and end address of recording inhibited part due to defect,
    and recording layer management information of one recording layer is recorded in each of the recording management areas of said one recording layer and one or more recording layers farther from a laser beam incident surface than said one recording layer.

2. The optical information recording and reproducing medium according to claim 1, wherein defect management information indicating a defect position of said one recording layer further includes a flag indicating defect information recorded in the recording management area of each recording layer.

3. The optical information recording and reproducing medium according to claim 2, wherein the defect management information of said one recording layer is recorded in a recording management area of said one or more recording layers.

4. The optical information recording and reproducing medium according to claim 1, wherein a guide groove of a wobbling shape is formed in at least one track of one of said plurality of recording layers, and the guide groove of the wobbling shape is subjected to track modulation for indicating a track address.

5. The optical information recording and reproducing medium according to claim 1, wherein the management information further includes a position of a recording start time zero set as a reference on the medium, a layer number, a recording start time of a recorded part, and an end time of the recorded part, the recording start time and the end time being referenced to said start time zero.

* * * * *